US 12,554,576 B2

United States Patent
Lee et al.

(10) Patent No.: US 12,554,576 B2
(45) Date of Patent: Feb. 17, 2026

(54) ERROR CORRECTION CODE ENGINE OF SEMICONDUCTOR MEMORY DEVICE AND SEMICONDUCTOR MEMORY DEVICE

(71) Applicant: Samsung Electronics Co., Ltd., Suwon-si (KR)

(72) Inventors: Donggeun Lee, Suwon-si (KR); Hyoungjoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/660,589

(22) Filed: May 10, 2024

(65) Prior Publication Data

US 2025/0208949 A1    Jun. 26, 2025

(30) Foreign Application Priority Data

Dec. 26, 2023 (KR) .................. 10-2023-0190904

(51) Int. Cl.
*G06F 11/10* (2006.01)

(52) U.S. Cl.
CPC ...... *G06F 11/1016* (2013.01); *G06F 11/1068* (2013.01)

(58) Field of Classification Search
CPC ............. G06F 11/1016; G06F 11/1068; G06F 11/1044; G06F 11/1048; G11C 29/42; H03M 13/03; H03M 13/1575
USPC ....................................................... 714/764
See application file for complete search history.

(56) References Cited

U.S. PATENT DOCUMENTS

| | | |
|---|---|---|
| 9,786,387 B2 | 10/2017 | Cha et al. |
| 10,090,066 B2 | 10/2018 | Cha et al. |
| 10,698,763 B2 | 6/2020 | Cha |
| 11,106,535 B2 | 8/2021 | Cho et al. |
| 11,385,960 B2 | 7/2022 | Cha |
| 11,461,174 B2 | 10/2022 | Lu |
| 11,462,292 B1 | 10/2022 | Kim et al. |
| 11,605,441 B1 | 3/2023 | Cho et al. |
| 11,687,410 B2 | 6/2023 | Rooney et al. |

(Continued)

FOREIGN PATENT DOCUMENTS

| | | | |
|---|---|---|---|
| KR | 20200021253 A | * 2/2020 | ............... G11C 8/10 |
| KR | 102178137 B1 | 11/2020 | |

(Continued)

*Primary Examiner* — Albert Decady
*Assistant Examiner* — Enam Ahmed
(74) *Attorney, Agent, or Firm* — Wolf, Greenfield & Sacks, P.C.

(57) ABSTRACT

An ECC engine of a semiconductor memory device includes an ECC encoder and an ECC decoder. The ECC encoder generates parity data based on main data based on a primitive polynomial and stores a codeword including the main data and the parity data in a target page. The ECC decoder reads the codeword from the target page based on an address to generate a syndrome and corrects at least one error bit in the read codeword based on the syndrome by respectively applying different syndromes to a single bit error in the read codeword, adjacent bit errors and non-adjacent bit errors occurring in non-adjacent two memory cells in the target page. The ECC decoder generates the different syndromes based on a parity check matrix generated as a function of the primitive polynomial. The primitive polynomial has an alpha matrix as a solution belonging to a Galois field.

20 Claims, 39 Drawing Sheets

(56) References Cited

U.S. PATENT DOCUMENTS

| | | | |
|---|---|---|---|
| 11,734,111 B2 | 8/2023 | Lu | |
| 2010/0125771 A1* | 5/2010 | Ukai | H03M 13/1575 |
| | | | 714/755 |
| 2013/0262957 A1 | 10/2013 | Wu et al. | |
| 2015/0311920 A1* | 10/2015 | Wang | G06F 11/1012 |
| | | | 714/764 |
| 2016/0026527 A1* | 1/2016 | Marov | H03M 13/154 |
| | | | 714/764 |
| 2016/0188407 A1* | 6/2016 | Bronnikov | G06F 11/1076 |
| | | | 714/766 |
| 2019/0294500 A1* | 9/2019 | Hara | G11C 29/52 |
| 2021/0194508 A1* | 6/2021 | Kim | G06F 11/1048 |
| 2022/0052712 A1* | 2/2022 | Pan | H03M 13/2942 |
| 2023/0178168 A1 | 6/2023 | Cho et al. | |
| 2023/0195566 A1* | 6/2023 | Bueb | G11C 29/42 |
| | | | 714/755 |
| 2023/0376378 A1 | 11/2023 | Lu | |

FOREIGN PATENT DOCUMENTS

| | | |
|---|---|---|
| KR | 102453437 B1 | 10/2022 |
| KR | 102506830 B1 | 3/2023 |
| TW | 202123241 A | 6/2021 |

* cited by examiner

FIG. 12A

CINX: 0 1 2 3 4 5 6 7

CINX: 0 1 2 3 4 5 6 7

CINX: 0 1 2 3 4 5 6 7

CINX: 0 1 2 3 4 5 6 7

CINX: 0 1 2 3 4 5 6 7

| $V_i$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $\alpha^{V_j}$ | 1 | $\alpha$ | $\alpha^2$ | $\alpha^3$ | $\alpha^4$ | $\alpha^5$ | $\alpha^6$ | $\alpha^7$ | $\alpha^8$ | $\alpha^9$ | $\alpha^{10}$ | $\alpha^{11}$ | $\alpha^{12}$ | $\alpha^{13}$ | $\alpha^{14}$ | $\alpha^{15}$ |
| $GF(2^5)$ | 1 | $\alpha$ | $\alpha^2$ | $\alpha^3$ | $\alpha^4$ | $\alpha^3 + 1$ | $\alpha^3 + \alpha$ | $\alpha^3 + \alpha^2 + 1$ | $\alpha^3 + \alpha^2 + \alpha$ | $\alpha^4 + \alpha^3 + \alpha^2 + 1$ | $\alpha^4 + \alpha + 1$ | $\alpha^3 + \alpha^2 + \alpha + 1$ | $\alpha^4 + \alpha^3 + \alpha^2 + 1$ | $\alpha^4 + \alpha^2 + 1$ | $\alpha + 1$ | $\alpha^2 + \alpha$ |

| $V_j$ | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| $\alpha^{V_j}$ | $\alpha^{16}$ | $\alpha^{17}$ | $\alpha^{18}$ | $\alpha^{19}$ | $\alpha^{20}$ | $\alpha^{21}$ | $\alpha^{22}$ | $\alpha^{23}$ | $\alpha^{24}$ | $\alpha^{25}$ | $\alpha^{26}$ | $\alpha^{27}$ | $\alpha^{28}$ | $\alpha^{29}$ | $\alpha^{30}$ | $\alpha^{31}$ |
| $GF(2^5)$ | $\alpha^3 + \alpha^2 + 1$ | $\alpha^4 + \alpha^3$ | $\alpha^4 + \alpha^3 + 1$ | $\alpha^4 + \alpha^3 + \alpha^2 + 1$ | $\alpha^4 + \alpha^3 + \alpha^2 + \alpha + 1$ | $\alpha^4 + \alpha^2 + \alpha + 1$ | $\alpha^2 + \alpha + 1$ | $\alpha^3 + \alpha^2 + \alpha$ | $\alpha^4 + \alpha^3 + \alpha^2$ | $\alpha^4 + 1$ | $\alpha^3 + \alpha + 1$ | $\alpha^4 + \alpha^2 + \alpha$ | $\alpha^2 + 1$ | $\alpha^3 + \alpha$ | $\alpha^4 + \alpha^2$ | 1 |

FIG. 14
ECC

| $V_j$ | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| $\alpha^0$ | 1 | 0 | 0 | 0 | 0 | 1 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 | 0 | 1 |
| $\alpha^1$ | 0 | 1 | 0 | 0 | 0 | 0 | 1 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 | 0 |
| $\alpha^2$ | 0 | 0 | 1 | 0 | 0 | 0 | 0 | 1 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 |
| $\alpha^3$ | 0 | 0 | 0 | 1 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 | 0 | 1 | 0 | 0 |
| $\alpha^4$ | 0 | 0 | 0 | 0 | 1 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 | 0 | 1 | 0 |

FIG. 16

$$PCMa = [\begin{array}{cccccc} 1 & \alpha & \alpha^2 & \alpha^3 & \cdots & \alpha^{q-1} \end{array}]$$

FIG. 17

$$Ha \times \underbrace{[\begin{array}{cccccc} 0 & 0 & 1 & 0 & \cdots & 0 \end{array}]^T}_{E_1} = \alpha^2$$

FIG. 18

$$Ha \times \underbrace{[\begin{array}{cccccc} 1 & 1 & 0 & 0 & \cdots & 0 \end{array}]^T}_{E_2} = 1 + \alpha = \alpha^{V_y}$$

| | | | | | | | | |
|---|---|---|---|---|---|---|---|---|
| 0 | 0 | 0 | 0 | 0 | 0 | 1 | 1 | ← eCV68 |
| 0 | 0 | 0 | 0 | 1 | 1 | 0 | 0 | |
| 0 | 0 | 1 | 1 | 0 | 0 | 0 | 0 | |
| 1 | 1 | 0 | 0 | 0 | 0 | 0 | 0 | ← eCV65 |
| 1 | 0 | 1 | 0 | 0 | 1 | 1 | 0 | |
| 1 | 0 | 0 | 0 | 1 | 1 | 1 | 0 | |
| 1 | 1 | 0 | 1 | 0 | 1 | 1 | 0 | |
| 1 | 0 | 0 | 1 | 0 | 0 | 1 | 0 | ← eCV61 |
| 1 | 0 | 1 | 0 | 0 | 1 | 0 | 1 | |
| 1 | 1 | 0 | 1 | 0 | 1 | 0 | 0 | |
| 1 | 1 | 0 | 0 | 0 | 0 | 0 | 0 | |
| 1 | 1 | 0 | 0 | 0 | 1 | 0 | 1 | ← eCV57 |
| 1 | 0 | 1 | 1 | 1 | 1 | 1 | 0 | |
| 1 | 0 | 0 | 0 | 0 | 0 | 0 | 0 | |
| 0 | 1 | 1 | 0 | 0 | 1 | 1 | 1 | |
| 1 | 1 | 1 | 0 | 1 | 0 | 1 | 1 | ← eCV53 |
| 1 | 0 | 0 | 0 | 0 | 1 | 1 | 1 | |
| 1 | 0 | 1 | 0 | 1 | 0 | 1 | 0 | |
| 0 | 0 | 1 | 0 | 1 | 0 | 1 | 1 | |
| 0 | 1 | 0 | 1 | 1 | 1 | 1 | 0 | ← eCV49 |
| 0 | 1 | 0 | 0 | 1 | 1 | 1 | 0 | |
| 1 | 0 | 1 | 1 | 0 | 1 | 0 | 1 | |
| 0 | 1 | 1 | 1 | 1 | 1 | 1 | 0 | |
| 1 | 0 | 1 | 1 | 0 | 1 | 1 | 1 | ← eCV45 |
| 1 | 1 | 0 | 1 | 1 | 1 | 1 | 0 | |
| 1 | 0 | 0 | 1 | 0 | 0 | 0 | 1 | |
| 0 | 1 | 1 | 1 | 0 | 1 | 0 | 1 | |
| 1 | 1 | 1 | 0 | 1 | 0 | 0 | 0 | ← eCV41 |
| 0 | 1 | 0 | 1 | 0 | 1 | 0 | 1 | |
| 1 | 0 | 1 | 0 | 1 | 0 | 1 | 1 | |
| 1 | 0 | 1 | 1 | 0 | 1 | 0 | 1 | |
| 0 | 1 | 1 | 0 | 0 | 1 | 0 | 1 | ← eCV37 |
| 0 | 0 | 1 | 0 | 1 | 1 | 0 | 0 | |
| 0 | 0 | 0 | 0 | 1 | 0 | 1 | 0 | ← eCV35 |

$$\begin{matrix} 1 \\ 0 \\ 1 \\ 0 \\ 0 \\ 1 \\ 1 \\ 1 \\ \downarrow \\ CV18 \end{matrix} \quad XOR \quad \begin{matrix} 0 \\ 1 \\ 1 \\ 1 \\ 1 \\ 0 \\ 0 \\ 0 \\ \downarrow \\ CV11 \end{matrix} \quad = \quad \begin{matrix} 1 \\ 1 \\ 0 \\ 1 \\ 1 \\ 1 \\ 1 \\ 1 \\ \downarrow \\ oCV4 \end{matrix}$$

FIG. 25

$$\begin{matrix} 0 \\ 0 \\ 0 \\ 0 \\ 0 \\ 0 \\ 0 \\ 1 \\ \downarrow \\ PV8 \end{matrix} \quad XOR \quad \begin{matrix} 1 \\ 0 \\ 0 \\ 0 \\ 0 \\ 0 \\ 0 \\ 0 \\ \downarrow \\ PV1 \end{matrix} \quad = \quad \begin{matrix} 1 \\ 0 \\ 0 \\ 0 \\ 0 \\ 0 \\ 0 \\ 1 \\ \downarrow \\ oCV68 \end{matrix}$$

FIG. 26A
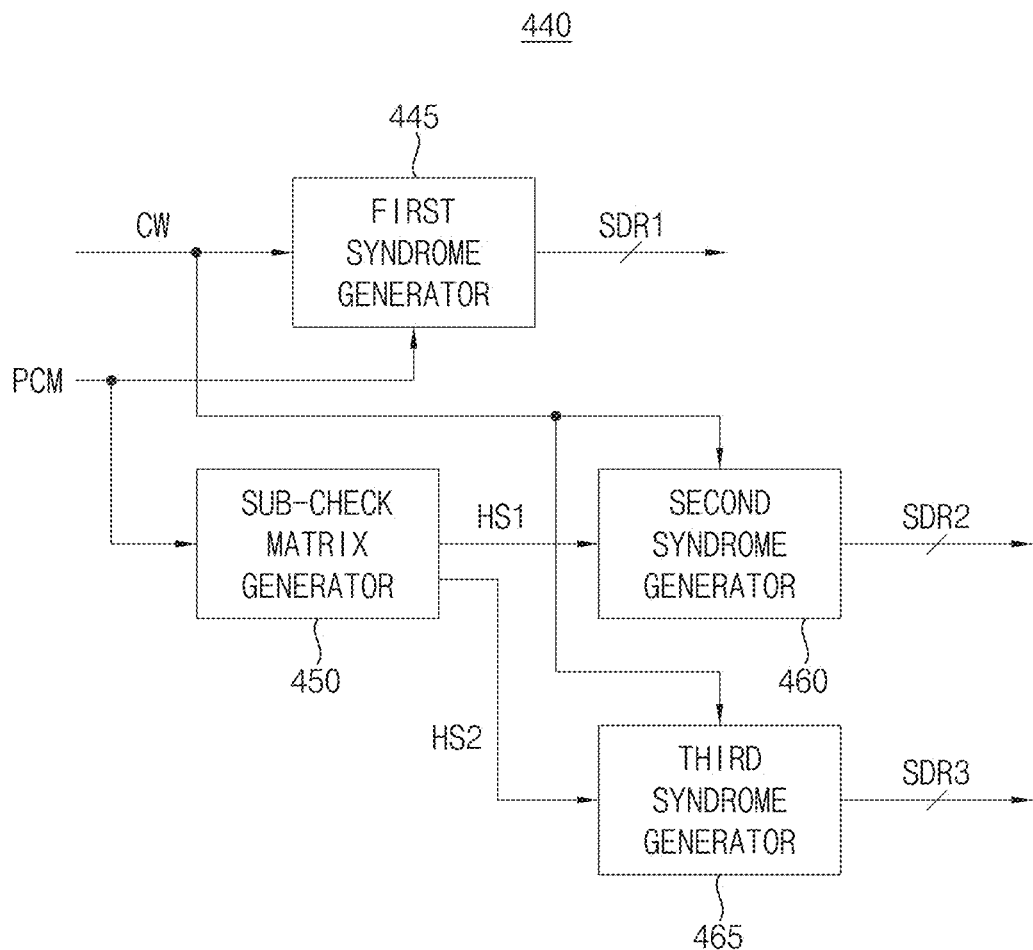
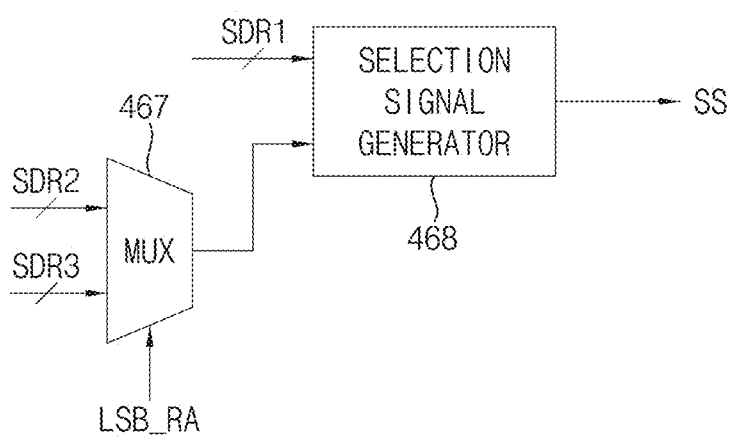

FIG. 26B

PCMc

| $V_j$ | $\alpha^7$ | $\alpha^6$ | $\alpha^5$ | $\alpha^4$ | $\alpha^3$ | $\alpha^2$ | $\alpha^1$ | $\alpha^0$ |
|---|---|---|---|---|---|---|---|---|
| 255 | 0 | 0 | 0 | 0 | 0 | 0 | 0 | 1 |
| ... | | | | | | | | |
| 222 | 1 | 0 | 0 | 0 | 0 | 0 | 0 | 1 |
| ... | | | | | | | | |
| 15 | 0 | 1 | 1 | 1 | 1 | 1 | 0 | 0 |
| 14 | 0 | 1 | 1 | 1 | 1 | 1 | 1 | 0 |
| 13 | 0 | 0 | 0 | 1 | 1 | 1 | 1 | 1 |
| 12 | 1 | 0 | 1 | 0 | 1 | 0 | 0 | 1 |
| 11 | 1 | 1 | 1 | 1 | 0 | 0 | 1 | 0 |
| 10 | 0 | 1 | 1 | 1 | 1 | 0 | 0 | 1 |
| 9 | 1 | 0 | 0 | 1 | 1 | 0 | 1 | 0 |
| 8 | 0 | 1 | 0 | 0 | 1 | 1 | 0 | 1 |
| 7 | 1 | 0 | 0 | 0 | 0 | 0 | 0 | 0 |
| 6 | 1 | 1 | 0 | 0 | 0 | 0 | 0 | 0 |
| 5 | 0 | 0 | 1 | 0 | 0 | 0 | 0 | 0 |
| 4 | 0 | 0 | 0 | 1 | 0 | 0 | 0 | 0 |
| 3 | 0 | 0 | 0 | 0 | 1 | 0 | 0 | 0 |
| 2 | 0 | 0 | 0 | 0 | 0 | 1 | 0 | 0 |
| 1 | 0 | 0 | 0 | 0 | 0 | 0 | 1 | 0 |
| 0 | 0 | 0 | 0 | 0 | 0 | 0 | 0 | 1 |

| Decimal | Candidate g(x) | Vj | mod(Vj, 15) |
|---|---|---|---|
| 285 | 100011101 | 25 | 10 |
| 299 | 100101011 | 243 | 3 |
| 301 | 100101101 | 240 | 0 |
| 333 | 101001101 | 23 | 8 |
| 351 | 101011111 | 122 | 2 |
| 355 | 101100011 | 197 | 2 |
| 357 | 101100101 | 233 | 8 |
| 361 | 101101001 | 16 | 1 |
| 369 | 101110001 | 231 | 6 |
| 391 | 110000111 | 99 | 9 |
| 397 | 110001101 | 59 | 14 |
| 425 | 110101001 | 13 | 13 |
| 451 | 111000011 | 157 | 7 |
| 463 | 111001111 | 141 | 6 |
| 487 | 111100111 | 115 | 10 |
| 501 | 111110101 | 134 | 14 |

FIG. 26D
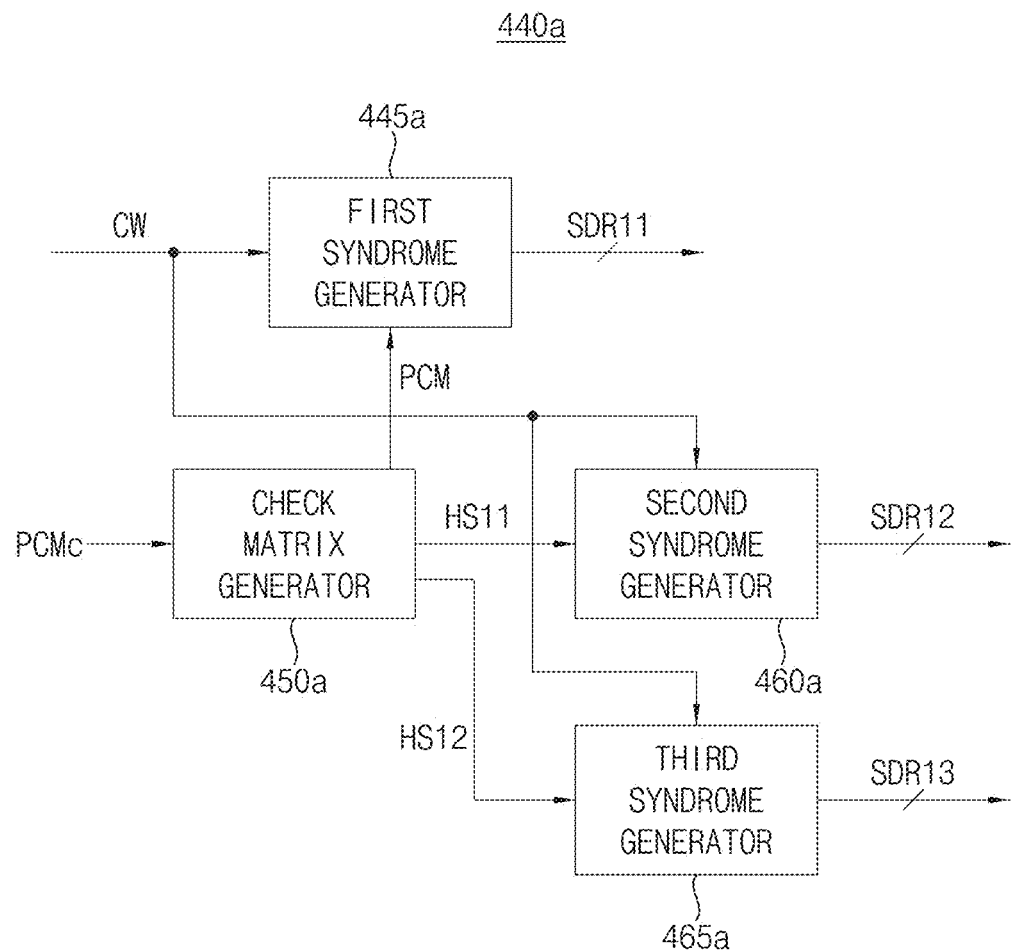
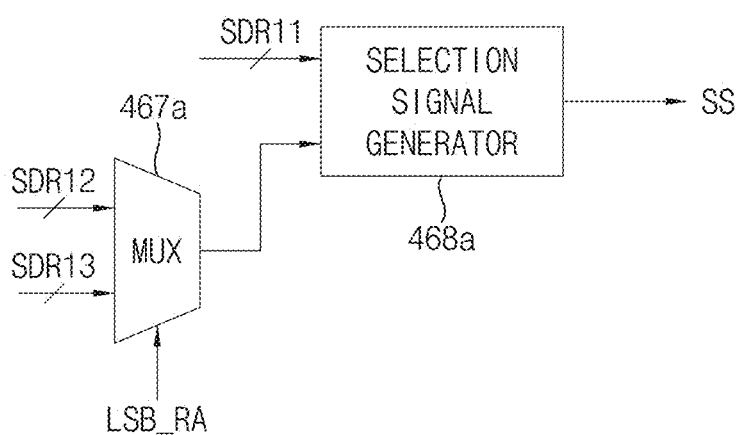

ERROR CORRECTION CODE ENGINE OF SEMICONDUCTOR MEMORY DEVICE AND SEMICONDUCTOR MEMORY DEVICE

CROSS-REFERENCE TO RELATED APPLICATION

This US application claims priority under 35 U.S.C. § 119 to Korean Patent Application No. 10-2023-0190904, filed on Dec. 26, 2023, the disclosure of which is incorporated herein by reference in its entirety.

BACKGROUND

Example embodiments of the present disclosure relate generally to memory devices, and more particularly, to error correction code (ECC) engines of semiconductor memory devices and semiconductor memory devices including the same.

Semiconductor memory devices may be classified as non-volatile memory devices, such as flash memory devices, and volatile memory devices, such as dynamic random access memory (DRAM) devices. DRAM devices are often used for system memories due to their high-speed operation and cost efficiency. Due to the continuing reduction in fabrication design rules of DRAM devices, bit errors of memory cells in DRAM devices may increase, and the yield of DRAM devices may decrease.

SUMMARY

Some example embodiments of the present disclosure provide an error correction code (ECC) engine of a semiconductor memory device, capable of enhancing performance and reliability.

Some example embodiments of the present disclosure provide a semiconductor memory device capable of enhancing performance and reliability.

According to some example embodiments, an ECC engine of a semiconductor memory device includes an ECC encoder and an ECC decoder. The ECC encoder generates parity data based on main data by using an ECC based on a primitive polynomial and stores a codeword including the main data and the parity data in a target page of a memory cell array. The ECC decoder reads the codeword from the target page based on an address to generate a syndrome and corrects at least one error bit in the read codeword based on the syndrome by applying different syndromes to a single bit error in the read codeword, adjacent bit errors occurring in adjacent two memory cells in the target page and non-adjacent bit errors occurring in non-adjacent two memory cells in the target page. The ECC decoder generates the different syndromes based on a parity check matrix based on a default parity check matrix that is generated as a function of the primitive polynomial. The primitive polynomial has an alpha matrix as a solution belonging to Galois field (also referred to as a finite field).

According to some example embodiments, a semiconductor memory device includes a memory cell array, an ECC engine and a control logic circuit. The memory cell array includes a plurality of volatile memory cells connected to a plurality of word-lines and a plurality of bit-lines. The ECC engine generates parity data based on main data by using an ECC as a function of a primitive polynomial, stores a codeword including the main data and the parity data in a target page of the memory cell array, reads the codeword from the target page based on an address to generate a syndrome and corrects at least one error bit in the read codeword based on the syndrome by applying different syndromes to a single bit error in the read codeword, adjacent bit errors occurring in adjacent two memory cells in the target page and non-adjacent bit errors occurring in non-adjacent two memory cells in the target page. The control logic circuit controls the ECC engine based on a command and the address. The ECC engine generates the different syndromes based on a parity check matrix based on a default parity check matrix that is generated based on the primitive polynomial. The primitive polynomial has an alpha matrix as a solution belonging to Galois field.

According to some example embodiments, a semiconductor memory device includes a memory cell array, an ECC engine and a control logic circuit. The memory cell array includes a plurality of volatile memory cells connected to a plurality of word-lines and a plurality of bit-lines. The ECC engine generates parity data based on main data by using an ECC as a function of a primitive polynomial, stores a codeword including the main data and the parity data in a target page of the memory cell array, reads the codeword from the target page based on an address to generate a syndrome and corrects at least one error bit in the read codeword based on the syndrome by applying different syndromes to a single bit error in the read codeword, adjacent bit errors occurring in adjacent two memory cells in the target page and non-adjacent bit errors occurring in non-adjacent two memory cells in the target page. The control logic circuit controls the ECC engine based on a command and the address. The ECC engine includes an ECC decoder that generates the different syndromes based on a parity check matrix based on a default parity check matrix that is generated as a function of the primitive polynomial. The primitive polynomial has an alpha matrix as a solution belonging to a Galois field. The ECC decoder generates a first sub-check matrix and a second sub-check matrix by using the parity check matrix based on a least significant bit (LSB) of a row address of the address, corrects the adjacent bit errors by applying the first sub-check matrix to the read codeword in response to the LSB of the row address being a low level and corrects the adjacent bit errors or the non-adjacent bit errors by applying the second sub-check matrix to the read codeword in response to the LSB of the row address being a high level.

Therefore, the on-die ECC engine and the semiconductor memory device including the on-die ECC engine may correct the single bit error, the adjacent two bit errors or the non-adjacent two bit errors by applying different syndromes to the single bit error and the two bit errors by using one parity check matrix, and thus may increase efficiency of error correcting.

BRIEF DESCRIPTION OF THE DRAWINGS

The above and other features of the present disclosure will become more apparent by describing in detail example embodiments thereof with reference to the accompanying drawings, wherein like reference numerals (when used) indicate corresponding elements throughout the several views.

FIGS. 12A through 12E illustrate examples of an error bit in a data pattern stored in a sub-array block according to a least significant bit (LSB) of the row address, respectively.

FIG. 13 is a table illustrating an example of generating a parity check matrix using a primitive polynomial, according to example embodiments.

FIG. 14 illustrates an example of an ECC that is generated based on a table of FIG. 13, according to example embodiments.

FIG. 16 illustrates an example of a default parity check matrix, according to example embodiments.

FIG. 17 illustrates an example of a single bit error that is included in the main data.

FIG. 18 illustrates an example of adjacent two bit errors that are included in the main data.

Figure 21A:
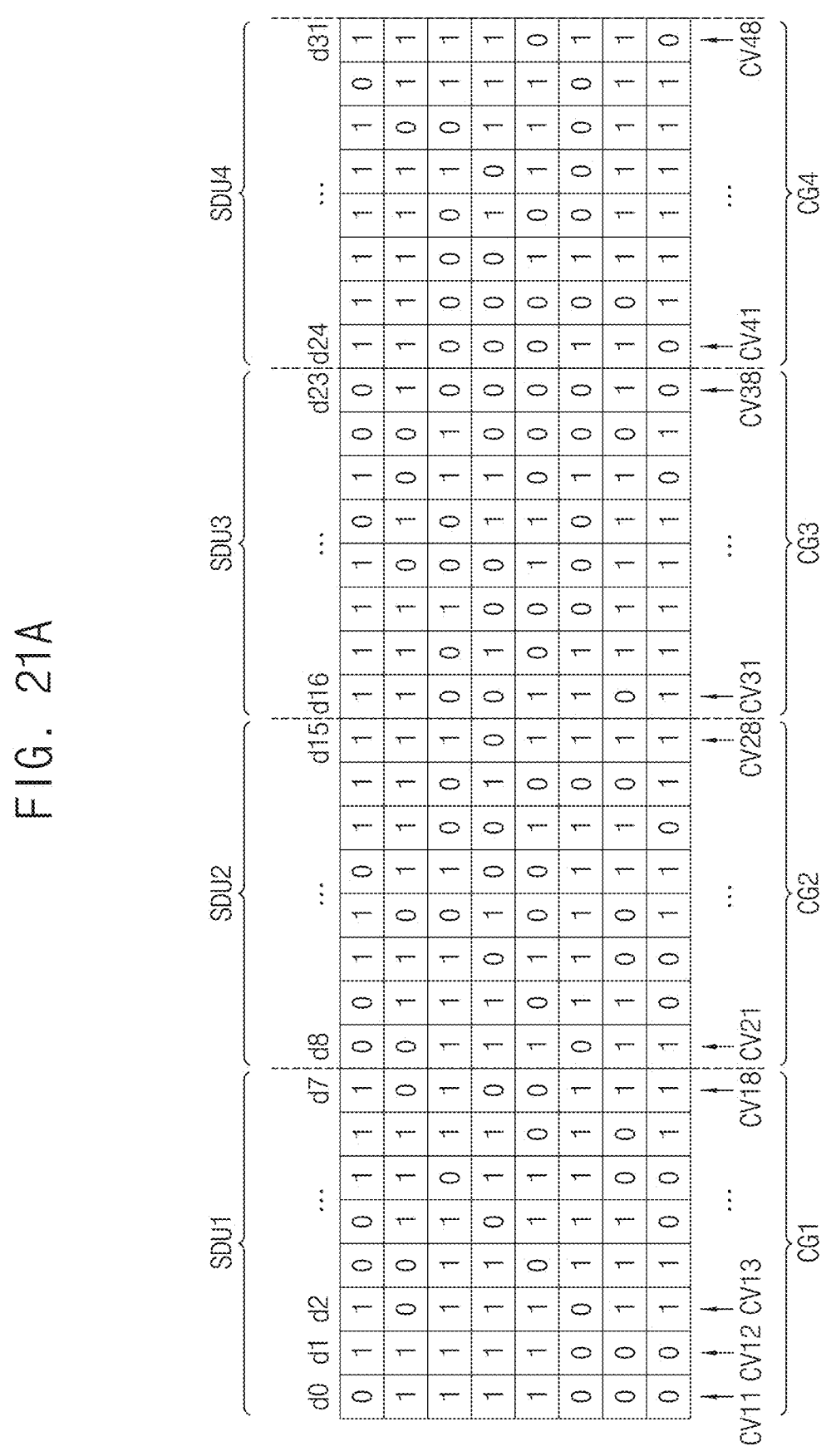
Figure 21B:
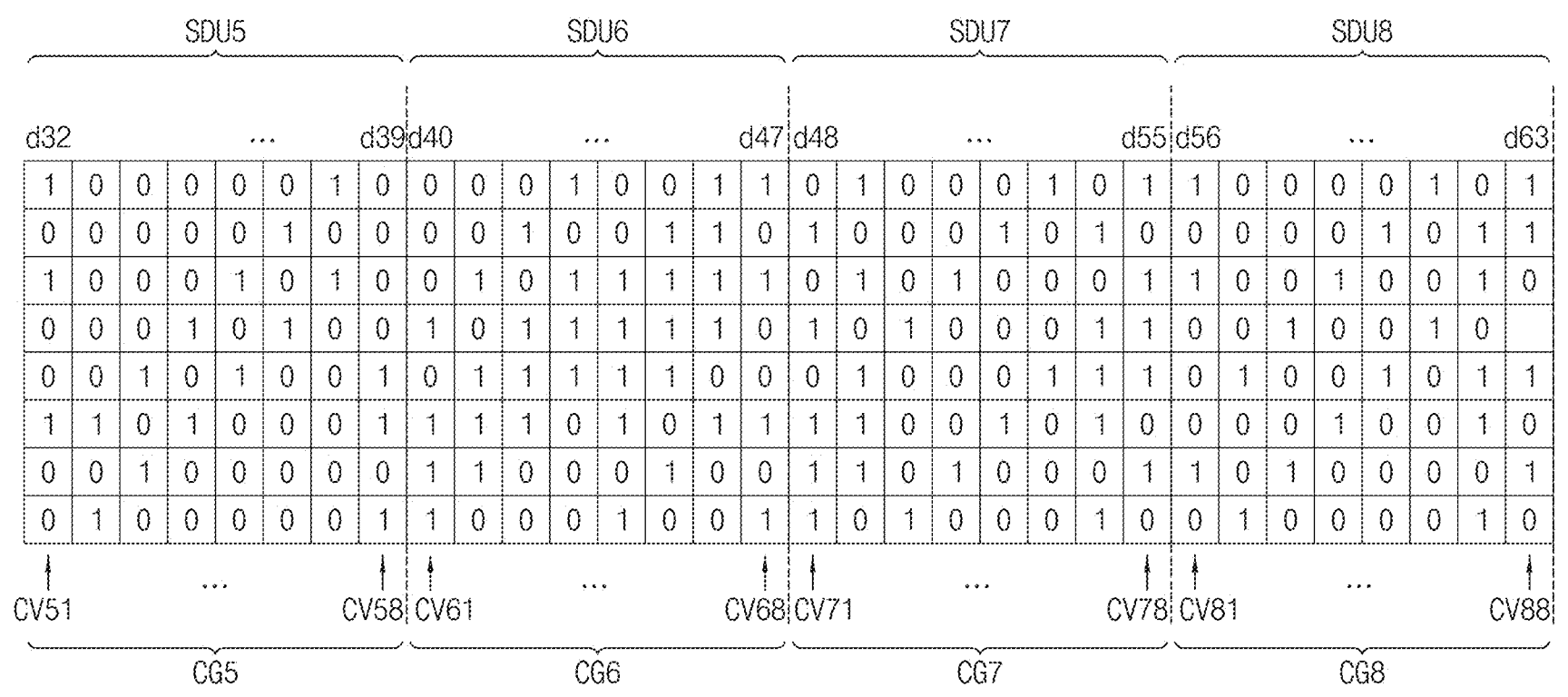
Figure 21C:
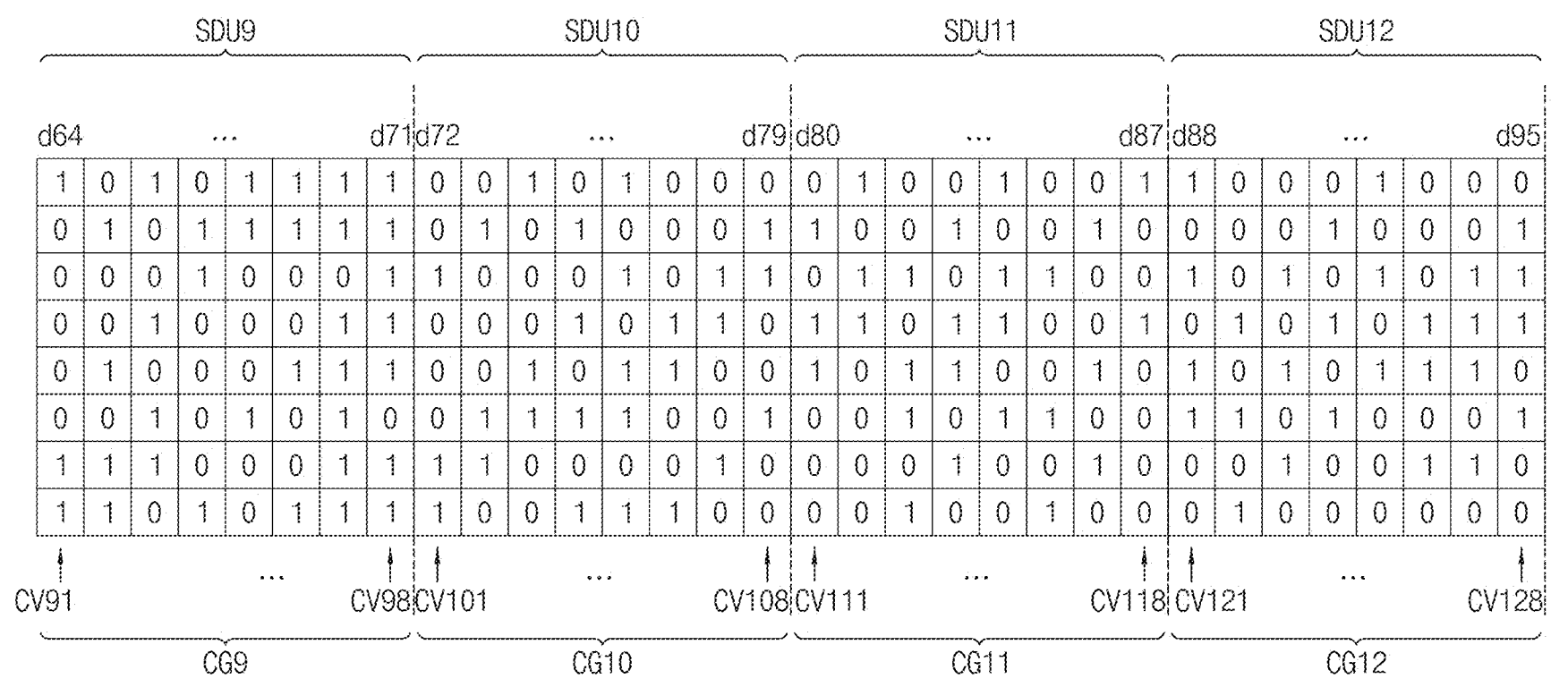
Figure 21D:
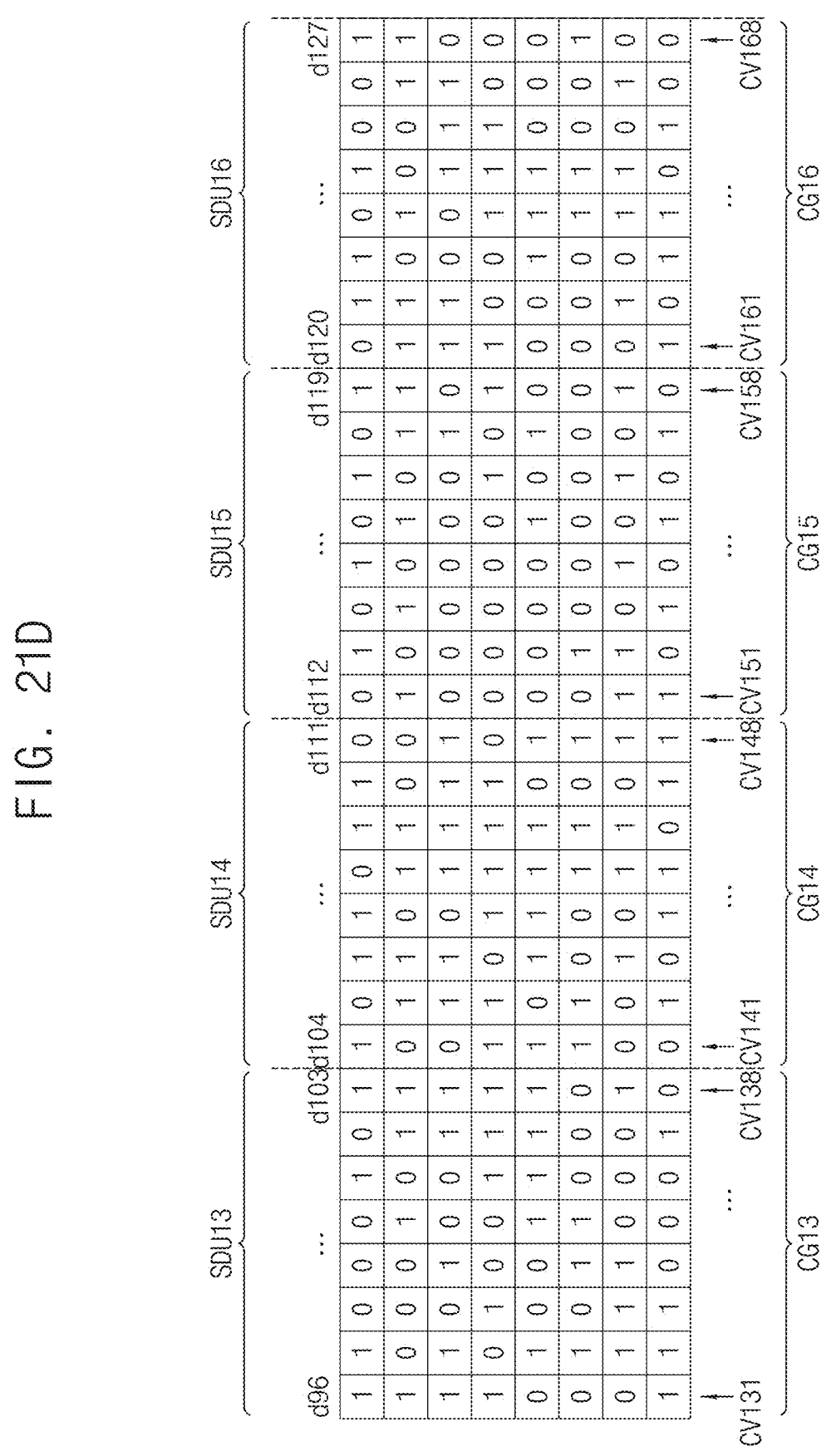
Figure 21E:
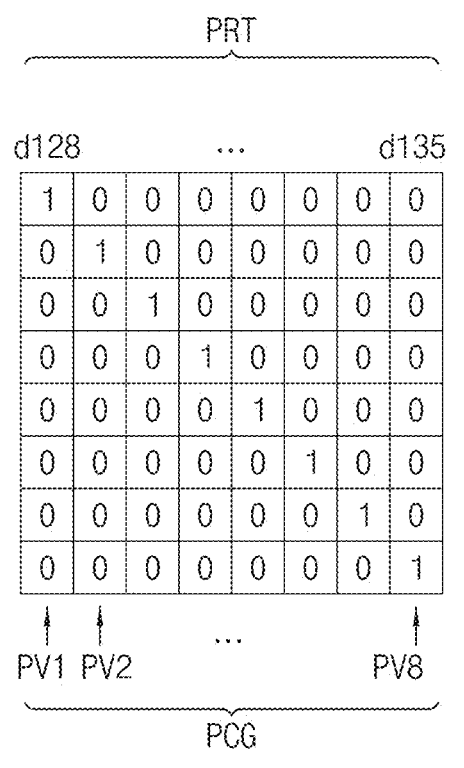

FIGS. 21A through 21E illustrate respective examples of the parity check matrix of FIG. 20.

FIGS. 22A and 22B illustrate respective examples of the first sub-check matrix which is generated by using the parity check matrix.

FIGS. 23A and 23B illustrate respective examples of the second sub-check matrix which is generated by using the parity check matrix.

FIGS. 24 and 25 illustrate examples of generating odd column vectors.

FIG. 26A is a schematic block diagram illustrating an example of a syndrome generation circuit in the ECC decoder of FIG. 15, according to some example embodiments.

FIG. 26B is an example of a default parity check matrix that is generated based on a primitive polynomial, according to example embodiments.

FIG. 26C is a table illustrating candidate primitive polynomials that are used for generating a default parity check matrix, according to example embodiments.

FIG. 26D is a block diagram illustrating an example of a syndrome generation circuit in the ECC decoder of FIG. 15, according to some example embodiments.

DETAILED DESCRIPTION

Figure 1:
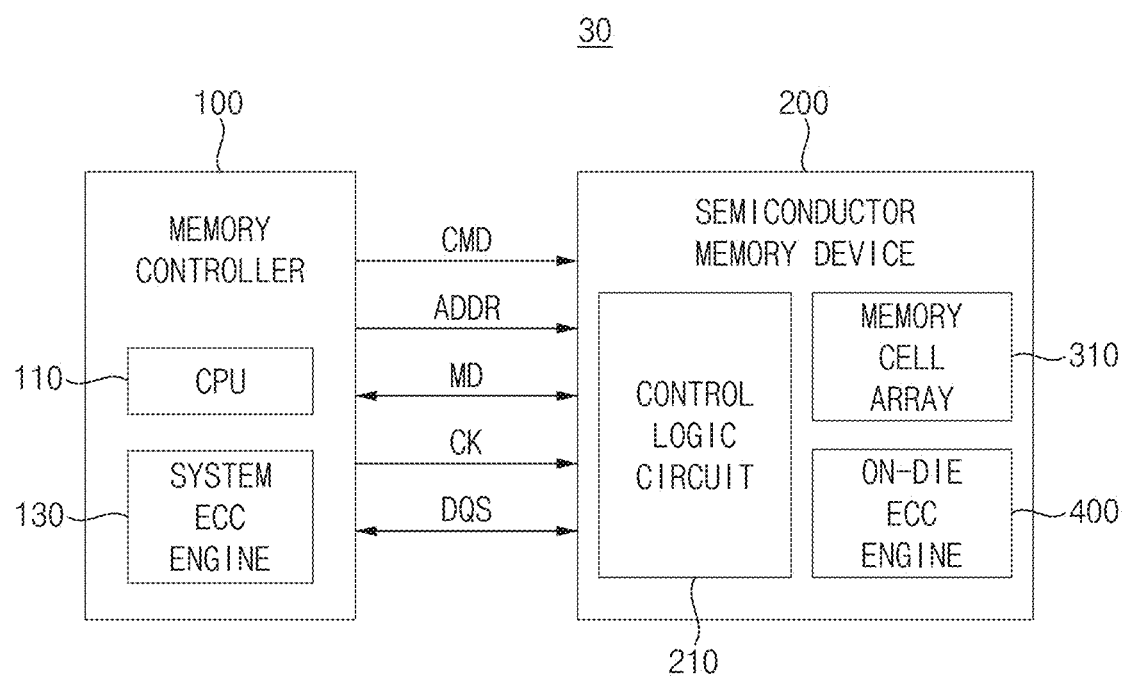
FIG. 1 is a schematic block diagram illustrating a memory system according to some example embodiments.

Example embodiments of the present disclosure will be described more fully hereinafter with reference to the accompanying drawings. Like reference numerals may refer to like elements throughout the accompanying drawings.

FIG. 1 is a schematic block diagram illustrating a memory system according to example embodiments of the present disclosure.

Referring to FIG. 1, a memory system 30 may include a memory controller 100 (e.g., an external memory controller) and a semiconductor memory device 200.

The memory controller 100 may control overall operation of the memory system 30. The memory controller 100 may control overall data exchange between an external host (not explicitly shown) and the semiconductor memory device 200. For example, the memory controller 100 may write data in the semiconductor memory device 200 or read data from the semiconductor memory device 200 in response to request from the host. In addition, the memory controller 100 may issue operation commands to the semiconductor memory device 200 for controlling the semiconductor memory device 200.

In example embodiments, the semiconductor memory device 200 is a memory device including a plurality of dynamic (volatile) memory cells, such as, for example, a dynamic random access memory (DRAM), double data rate 5 (DDR5) synchronous DRAM (SDRAM), or DDR6 SDRAM, although embodiments are not limited thereto.

The memory controller 100 may transmit a clock signal CK, a command CMD, and an address (signal) ADDR to the semiconductor memory device 200. Herein, for convenience of description, the singular terms a clock signal CK, a command CMD, and an address ADDR and the plural terms clock signals CK, commands CMD, and addresses ADDR may be used interchangeably. The memory controller 100 may transmit a data strobe signal DQS to the semiconductor memory device 200 when the memory controller 100 writes main data MD in the semiconductor memory device 200. The semiconductor memory device 200 may transmit a data strobe signal DQS to the memory controller 30 when the memory controller 100 reads main data MD from the semiconductor memory device 200. The address ADDR may be accompanied by the command CMD and the address ADDR may be referred to as an access address.

The memory controller 100 may include a central processing unit (CPU) 110 that controls overall operation of the memory controller 100 and a system ECC engine 130.

The semiconductor memory device 200 includes a memory cell array 310 that stores the main data MD, an error correction circuit (on-die ECC engine) 400 and a control logic circuit 210. The error correction circuit 400 may be referred to a first error correction circuit. The memory cell array 310 includes a plurality of sub array blocks arranged in a first direction and a second direction crossing the first direction. It will be understood that, although ordinal terms such as "first," "second," etc., may be used throughout this specification to describe various elements, these elements should not be limited by such terms. These terms are used merely to distinguish one element from another and are not intended to convey any particular order of the elements unless specifically stated. For example, a first element could be termed a second element, and, similarly, a second element could be termed a first element, without departing from the scope of the present inventive concept.

The system ECC engine 130 may generate parity data based on the main data MD to be transmitted to the semiconductor memory device 200, may store the parity data therein, may generate check bits based on the main data MD received from the semiconductor memory device 200 and may correct error bits in the main data MD by comparing the parity data and the check bits.

The semiconductor memory device 200 includes a memory cell array 310 that stores the main data MD, an on-die ECC engine 400 and a control logic circuit 210. The on-die ECC engine 400 may be referred to an ECC engine for convenience of explanation. The memory cell array 310 may include a plurality of sub array blocks arranged in a first direction and a second direction crossing the first direction.

The on-die ECC engine 400 may generate a parity data by performing an ECC encoding on the main data MD using an ECC based on a primitive polynomial and may correct/detect error bits in a read data by performing an ECC decoding on the read data from a target page of the memory cell array 310. The on-die ECC engine 400 may include an ECC decoder. The ECC decoder may read a codeword from the target page based on an address provided from the memory controller 100 to generate a syndrome, may correct at least one error bit in the read codeword based on the syndrome by applying different syndromes to a single bit error in the read codeword, adjacent bit errors occurring in adjacent two memory cells in the target page and non-adjacent bit errors occurring in non-adjacent two memory cells in the target page. The ECC decoder may generate the different syndromes based on a parity check matrix based on a default parity check matrix that is generated as a function of the primitive polynomial. The primitive polynomial may have an alpha matrix as a solution belonging to Galois field (also referred to as an infinite field).

The main data MD may include a plurality of sub data units and each of the plurality of sub data units may include a plurality of data bits. The ECC may include a plurality of column vectors divided into a plurality of code groups corresponding to the sub data units and the parity data. The plurality of column vectors may correspond to results of powers of the alpha matrix and the alpha matrix may have exponent values gradually increasing from zero.

The semiconductor memory device 200 may perform a burst operation. Herein, the burst operation refers to an operation of writing or reading a large amount of data by sequentially increasing or decreasing an initial address provided from the memory controller 100. A basic unit of the burst operation may be referred to a burst length BL. In example embodiments, the burst length BL may refer to the number of operations of continuously reading or writing data by sequentially increasing or decreasing an initial address.

Figure 2:
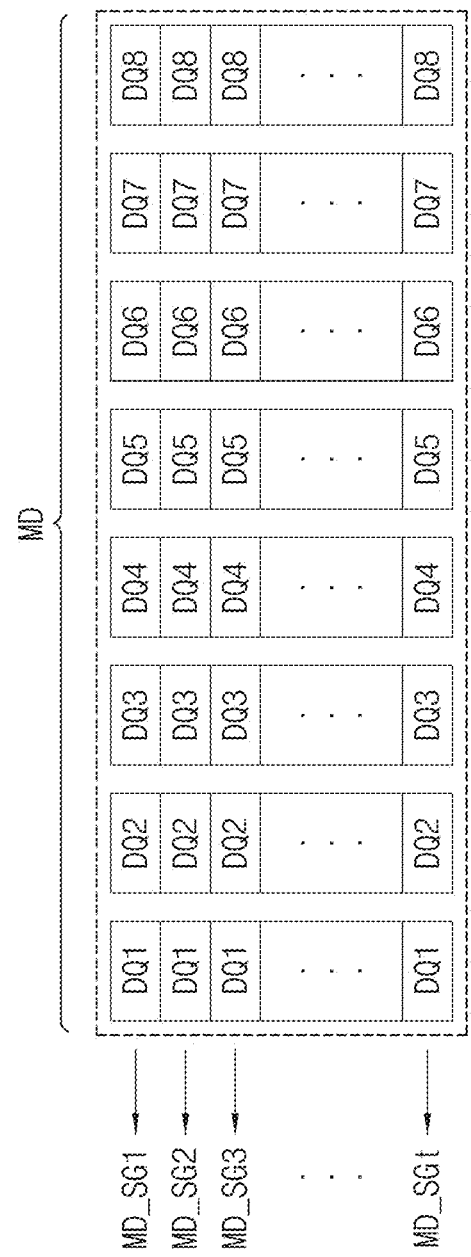
FIG. 2 illustrates main data corresponding to the plurality of burst lengths in the memory system of FIG. 1, according to some example embodiments.

FIG. 2 illustrates main data corresponding to the plurality of burst lengths in the memory system of FIG. 1, according to some example embodiments.

Referring to FIG. 2, the main data MD corresponding to the plurality of burst lengths may be input to/output from the semiconductor memory device 200. The main data MD includes a plurality of data segments MD_SG1~MD_SGt (where t is a natural number equal to or greater than 8) each corresponding to each of the plurality of burst lengths. The burst length is assumed to be 8 in FIG. 2. However, example embodiments are not limited thereto. The main data MD corresponding to the plurality of burst lengths may be stored in the memory cell array 310 of the semiconductor memory device 200 (FIG. 1). The main data MD may be arranged into a plurality of columns, for example eight columns (DQ1 through DQ8) in some embodiments. Each of the data segments includes a corresponding row across the plurality of columns.

Figure 3:
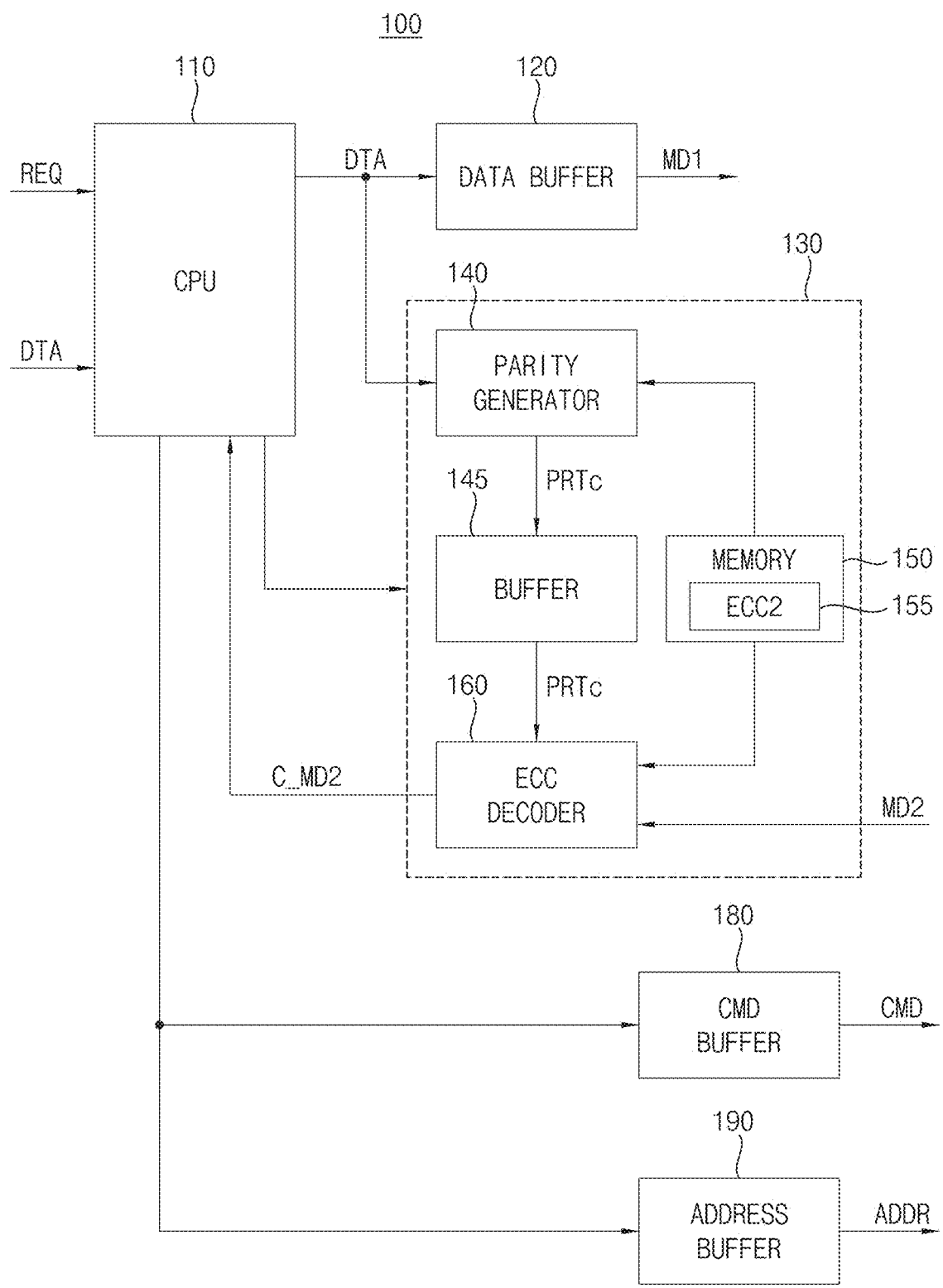
FIG. 3 is a schematic block diagram illustrating an example of the memory controller shown in FIG. 1, according to some example embodiments.

FIG. 3 is a schematic block diagram illustrating at least a portion of an example of the memory controller 100 shown in FIG. 1, according to some example embodiments.

Referring to FIG. 3, the memory controller 100 may include the CPU 110, a data buffer 120, the system ECC engine 130, a command (CMD) buffer 180 and an address buffer 190. The system ECC engine 130 may include a parity generator 140, a buffer 145, a memory 150 that stores a second ECC (ECC2) 155, and an ECC decoder 160.

The CPU 110 may receive a request REQ and data DTA from the host (not explicitly shown), and may provide the data DTA to the data buffer 120 and the parity generator 140.

The data buffer 120 may buffer the data DTA and provide a first main data MID to the semiconductor memory device 200 (FIG. 1).

The parity generator 140 may be connected to the memory 150, may perform an ECC encoding on the data DTA using the second ECC 155 to generate a parity data PRTc and may store the parity data PRTc in the buffer 145. The term "connected" (or "connecting," or like terms such as "contact" or "contacting"), as may be used herein, is intended to refer to a physical and/or electrical connection between two or more elements, and may include other intervening elements. As used herein, the term "and/or" includes any and all combinations of one or more of the associated listed items.

The ECC decoder 160, during a read operation of the semiconductor memory device 200, may receive a second main data MD2 from the semiconductor memory device 200, may perform an ECC decoding on the second main data MD2 by using the second ECC 155 and the system parity data PRTc provided to the ECC decoder 160, and may provide a corrected main data C_MD2 to the CPU 110. The CPU 110 provides the corrected main data C_MD2 to the host.

The command buffer 180 may store the command CMD corresponding to the request REQ and may transmit the command CMD to the semiconductor memory device 200 under control of the CPU 110. The address buffer 190 may store the address ADDR and may transmit the address ADDR to the semiconductor memory device 200 under control of the CPU 110.

Figure 4:
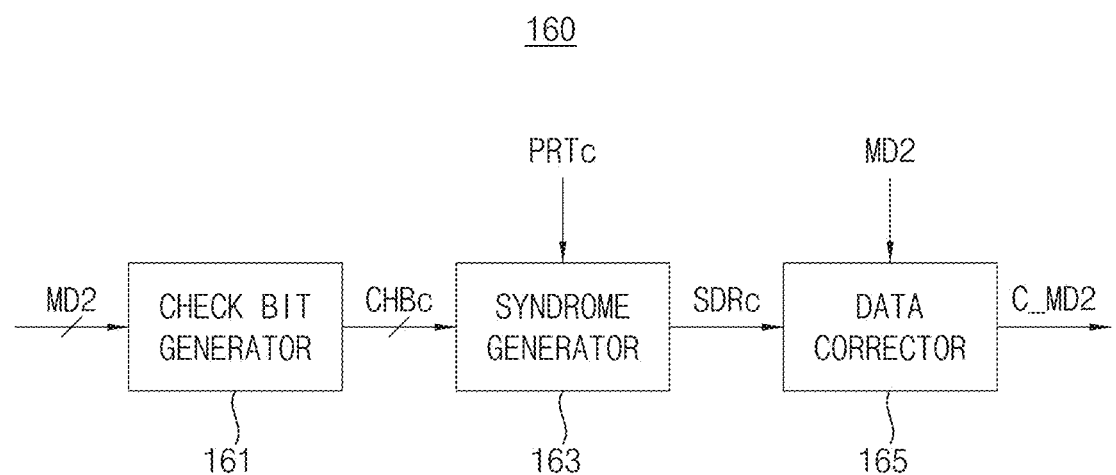
FIG. 4 is a schematic block diagram illustrating an example of the ECC decoder shown in FIG. 3, according to some example embodiments.

FIG. 4 is a schematic block diagram illustrating an example of the ECC decoder 160 shown in FIG. 3, according to some example embodiments.

Referring to FIG. 4, the ECC decoder 160 may include a check bit generator 161, a syndrome generator 163 and a data corrector 165.

The check bit generator 161 may receive the second main data MD2, and may generate check bits CHBc corresponding to the second main data MD2 using the second ECC 155 (FIG. 3).

The syndrome generator 163 may compare the system parity data PRTc and the check bits CHBc to generate a syndrome data SDRc indicating whether the second main data MD2 includes at least one error bit and indicating a position of the at least one error bit.

The data corrector 165 may receive the second main data MD2 and may correct the error bits in the second main data MD2 based on the syndrome data SDRc to output the corrected main data C_MD2.

Figure 5:
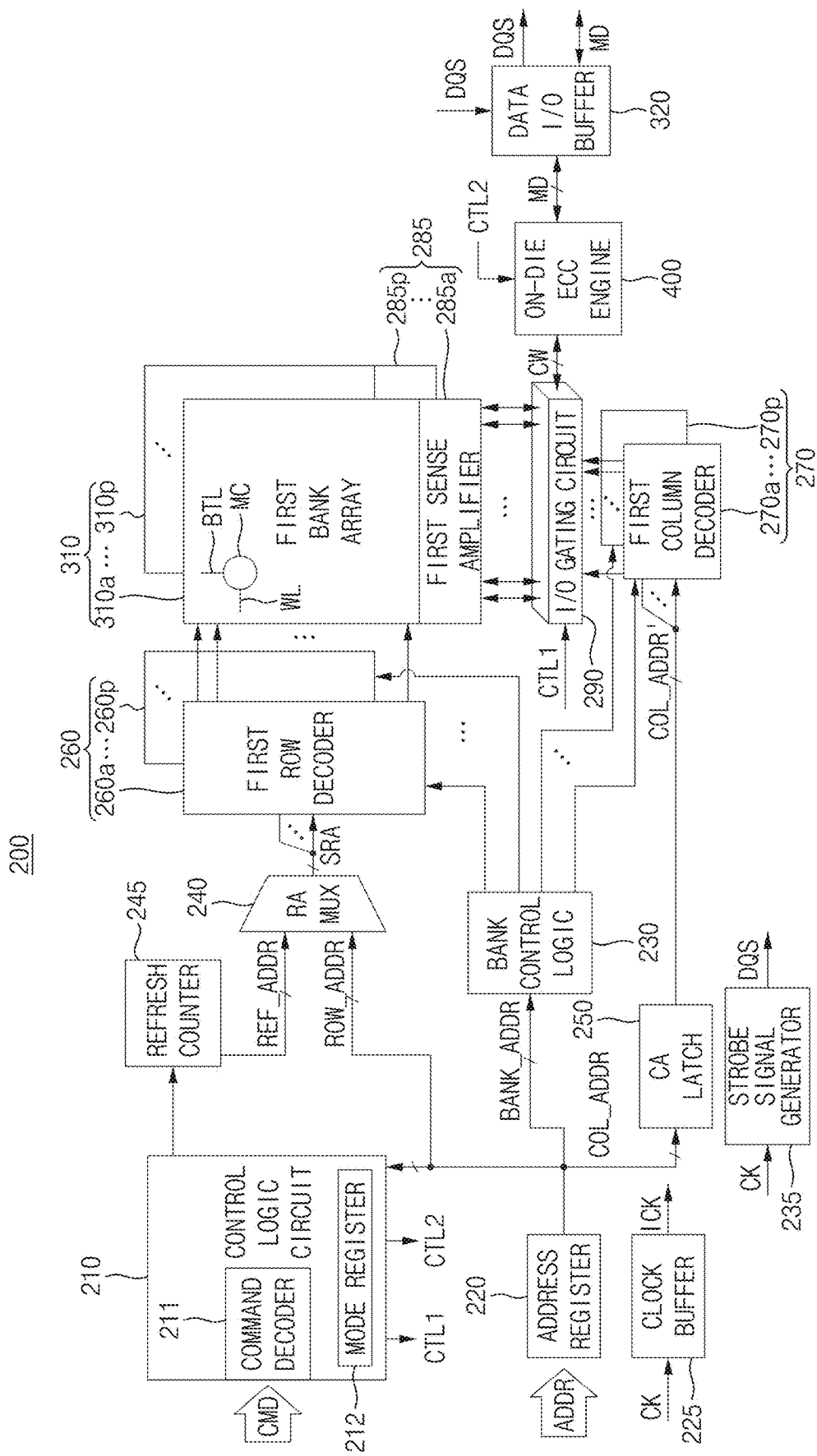
FIG. 5 is a schematic block diagram illustrating a semiconductor memory device as shown in FIG. 1, according to some example embodiments.

FIG. 5 is a schematic block diagram illustrating at least a portion of an example of the semiconductor memory device 200 shown in FIG. 1, according to example embodiments.

Referring to FIG. 5, the semiconductor memory device 200 may include the control logic circuit 210, an address register 220, a bank control logic 230, a refresh counter 245, a row address (RA) multiplexer 240, a column address (CA) latch 250, a row decoder 260, a column decoder 270, the memory cell array (bank array) 310, a sense amplifier unit 285, an input/output (I/O) gating circuit 290, the on-die ECC engine 400, a clock buffer 225, a strobe signal generator 235, and a data I/O buffer 320.

The memory cell array 310 may include first through sixteenth bank arrays 310a~310p. The row decoder 260 may include first through sixteenth row decoders 260a~260p respectively coupled to the first through sixteenth bank arrays 310a~310p, the column decoder 270 may include first through sixteenth column decoders 270a~270p respectively coupled to the first through sixteenth bank arrays 310a~310p, and the sense amplifier unit 285 may include first through sixteenth sense amplifiers 285a~285p respectively coupled to the first through sixteenth bank arrays 310a~310p. Although sixteen bank arrays 310a~310p are shown in the example semiconductor memory device 200 of FIG. 5, embodiments are not limited to any specific number of bank arrays.

The first through sixteenth bank arrays 310a~310p, the first through sixteenth row decoders 260a~260p, the first through sixteenth column decoders 270a~270p and first through sixteenth sense amplifiers 285a~285p may form first through sixteenth banks. Each of the first through sixteenth bank arrays 310a~310p may include a plurality of memory cells MC formed at intersections of a plurality of word-lines WL and a plurality of bit-lines BTL.

The address register 220 may receive the address ADDR including a bank address BANK_ADDR, a row address ROW_ADDR and a column address COL_ADDR from the memory controller 100 (FIG. 1). The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through sixteenth row decoders 260a~260p corresponding to the bank address BANK_ADDR is activated in response to the bank control signals, and one of the first through sixteenth column decoders 270a~270p corresponding to the bank address BANK_ADDR is activated in response to the bank control signals.

The row address multiplexer 240 may receive the row address ROW_ADDR from the address register 220, and may receive a refresh row address REF_ADDR from the refresh counter 245. The row address multiplexer 240 may selectively output the row address ROW_ADDR or the refresh row address REF_ADDR as a row address SRA. The row address SRA that is output from the row address multiplexer 240 is applied to the first through sixteenth row decoders 260a~260p.

The refresh counter 245 may sequentially increase or decrease the refresh row address REF_ADDR under control of the control logic circuit 210.

The activated one of the first through sixteenth row decoders 260a~260p, by the bank control logic 230, may decode the row address SRA that is output from the row address multiplexer 240, and may activate a word-line corresponding to the row address SRA. For example, the activated bank row decoder applies a word-line driving voltage to the word-line corresponding to the row address.

The column address latch 250 may receive the column address COL_ADDR from the address register 220, and may temporarily store the received column address COL_ADDR. In some embodiments, in a burst mode, the column address latch 250 may generate column address COL_ADDR' that increments from the received column address COL_ADDR. The column address latch 250 may apply the temporarily stored or generated column address COL_ADDR' to the first through sixteenth column decoders 270a~270p.

The activated one of the first through sixteenth column decoders 270a~270p may activate a sense amplifier corresponding to the bank address BANK_ADDR and the column address COL_ADDR through the I/O gating circuit 290.

The I/O gating circuit 290 may include circuitry for gating input/output data, and may further include input data mask logic, read data latches for storing data that is output from the first through sixteenth bank arrays 310a~310p, and write drivers for writing data to the first through sixteenth bank arrays 310a~310p.

Codeword CW (e.g., read codeword RCW in FIG. 10) read from a selected bank array of the first through sixteenth bank arrays 310a~310p is sensed by a corresponding sense amplifier 285 coupled to the selected bank array from which the data is to be read, and is stored in the read data latches of the I/O gating circuit 290. The codeword CW stored in the read data latches may be provided to the data I/O buffer 320 as the main data MD (e.g., corrected main data C_MD in FIG. 10) after ECC decoding is performed on the codeword CW by the on-die ECC engine 400. The data I/O buffer 320 transmits the main data MD along with the data strobe signal DQS to the memory controller 100.

The main data MD to be written in a selected bank array of the first through sixteenth bank arrays 310a~310p may be provided to the data I/O buffer 320 with the data strobe signal DQS from the memory controller 100. The data I/O buffer 320 may provide the main data MD to the on-die ECC engine 400. The on-die ECC engine 400 may perform an ECC encoding on the main data MD to generate parity bits (or parity data), and the on-die ECC engine 400 may provide the codeword CW including main data MD and the parity bits to the I/O gating circuit 290. The I/O gating circuit 290 may write the codeword CW in a sub-page in the selected bank array through the write drivers.

The data I/O buffer 320 may provide the main data MD from the memory controller 100 to the on-die ECC engine 400 in a write operation of the semiconductor memory device 200 and may transmit the main data MD and the data strobe signal DQS to the memory controller 100 in a read operation of the semiconductor memory device 200.

The on-die ECC engine 400 may perform an ECC encoding on the main data MD and may perform an ECC decoding on the codeword CW based on a second control signal CTL2 from the control logic circuit 210. The on-die ECC engine 400 may read a codeword from the target page based on an address provided from the memory controller 100 (FIG. 1) to generate a syndrome, may correct at least one error bit in the read codeword based on the syndrome by applying different syndromes to a single bit error in the read codeword, adjacent bit errors occurring in adjacent two memory cells in the target page and non-adjacent bit errors occurring in non-adjacent two memory cells in the target page.

The clock buffer 225 may receive the clock signal CK, may generate an internal clock signal ICK by buffering the clock signal CK, and may provide the internal clock signal ICK to circuit components processing the command CMD and the address ADDR.

The strobe signal generator 235 may receive the clock signal CK, may generate the data strobe signal DQS based on the clock signal CK and may provide the data strobe signal DQS to the data I/O buffer 320.

The control logic circuit 210 may control operations of the semiconductor memory device 200. For example, the control logic circuit 210 may generate control signals for the semiconductor memory device 200 in order to perform a write operation, a read operation, a refresh operation. The control logic circuit 210 may include a command decoder 211 that decodes the command CMD received from the memory controller 100 (FIG. 1) and a mode register 212 that sets an operation mode of the semiconductor memory device 200.

For example, the command decoder 211 may generate the control signals corresponding to the command CMD by decoding a write enable signal, a row address strobe signal, a column address strobe signal, a chip select signal, etc. The control logic circuit 210 may provide a first control signal CTL1 to the I/O gating circuit 290 and the second control signal CTL2 to the on-die ECC engine 400.

Figure 6:
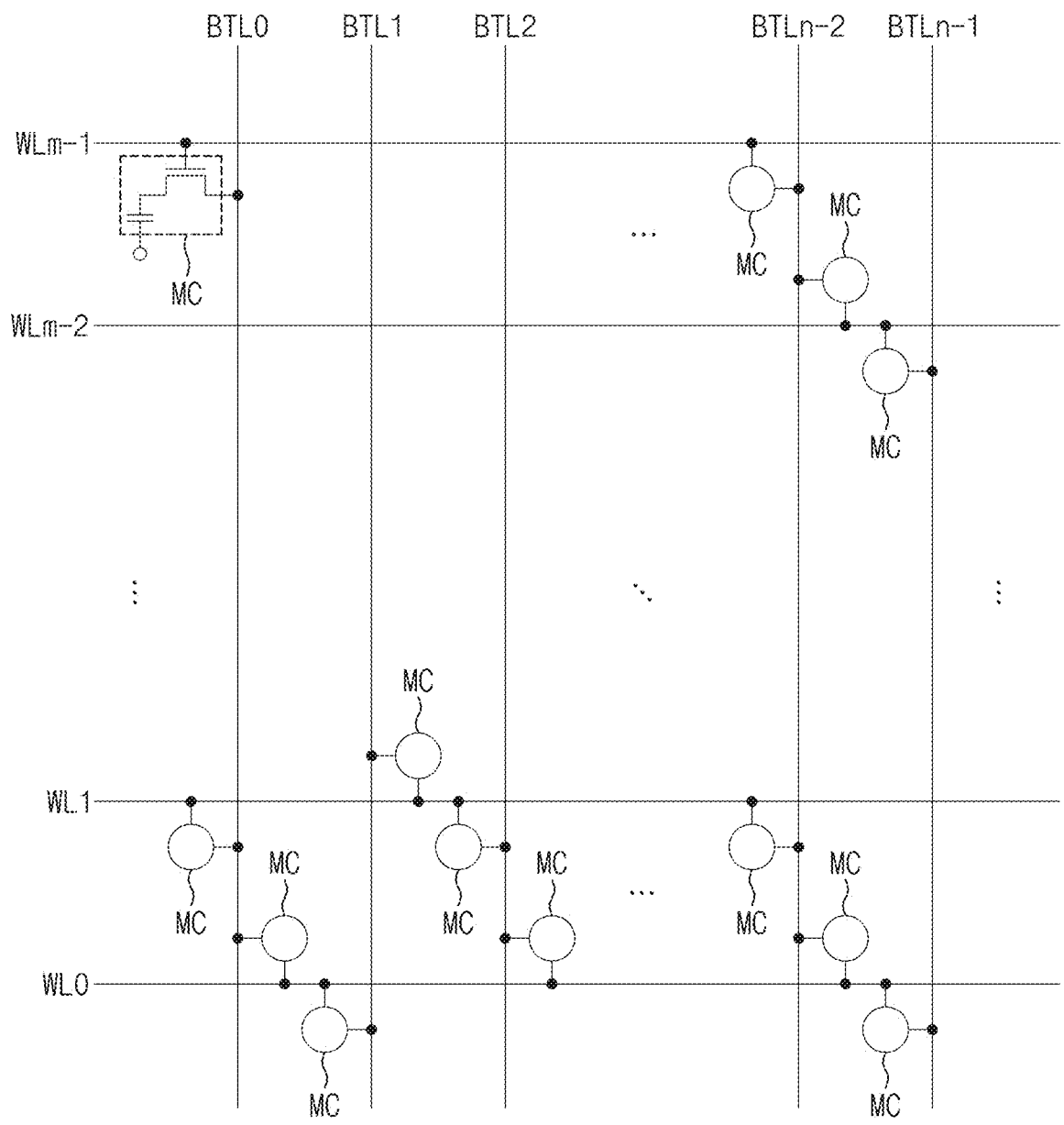
FIG. 6 illustrates an example of a first bank array in the semiconductor memory device of FIG. 5, according to some example embodiments.

FIG. 6 illustrates an example of the first bank array 310a in the semiconductor memory device 200 of FIG. 5, according to one or more embodiments.

Referring to FIG. 6, the first bank array 310a may include a plurality of word-lines WL0~WLm−1 (m is a natural number greater than two), a plurality of bit-lines BTL0~BTLn−1 (n is a natural number greater than two), and a plurality of memory cells MCs disposed at intersections between the word-lines WL0~WLm−1 and the bit-lines BTL0~BTLn−1. Each of the memory cells MCs includes a cell transistor coupled to each of the word-lines WL0~WLm−1 and each of the bit-lines BTL0~BTLn−1 and a cell capacitor coupled to the cell transistor. Each of the memory cells MCs may have a DRAM cell structure. Each of the word-lines WL0~WLm−1 extends in a first direction D1 and each of the bit-lines BTL1~BTLn−1 extends in a second direction D2 crossing the first direction D1.

The word-lines WL0~WLm−1 coupled to the plurality of memory cells MCs may be referred to as rows of the first bank array 310a and the bit-lines BTL0~BTLn−1 coupled to the plurality of memory cells MCs may be referred to as columns of the first bank array 310a.

Figure 7:
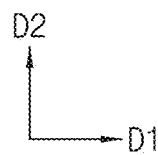
FIG. 7 illustrates an example of the first bank array in the semiconductor memory device of FIG. 5, according to some example embodiments.

FIG. 7 illustrates an example of the first bank array in the semiconductor memory device of FIG. 5 according to some example embodiments.

Referring to FIG. 7, in the first bank array 310a, I sub-array blocks SCB may be disposed in the first direction D1, and J sub-array blocks SCB may be disposed in the second direction D2 substantially perpendicular to the first direction D1. I and J represent a number of sub-array blocks SCB in the first direction and the second direction, respectively, and are natural numbers greater than two. A plurality of bit-lines, a plurality of word-lines and a plurality of memory cells connected to the bit-lines and the word-lines are disposed in each of the sub-array blocks SCB.

I+1 sub-word-line driver regions SWB may be disposed between the sub-array blocks SCB in the first direction D1. Sub-word-line drivers may be disposed in the sub-word-line driver regions SWB. J+1 bit-line sense amplifier regions BLSAB may be disposed, for example, between the sub-array blocks SCB in the second direction D2. Bit-line sense amplifiers to sense data stored in the memory cells may be disposed in the bit-line sense amplifier regions BLSAB.

A plurality of conjunction regions CONJ may be disposed adjacent to the sub-word-line driver regions SWB and the bit-line sense amplifier regions BLSAB. A voltage generator may be disposed in each of the conjunction regions CONJ. A portion 390 in the first bank array 310a may be described with reference to FIG. 8 below.

Figure 8:
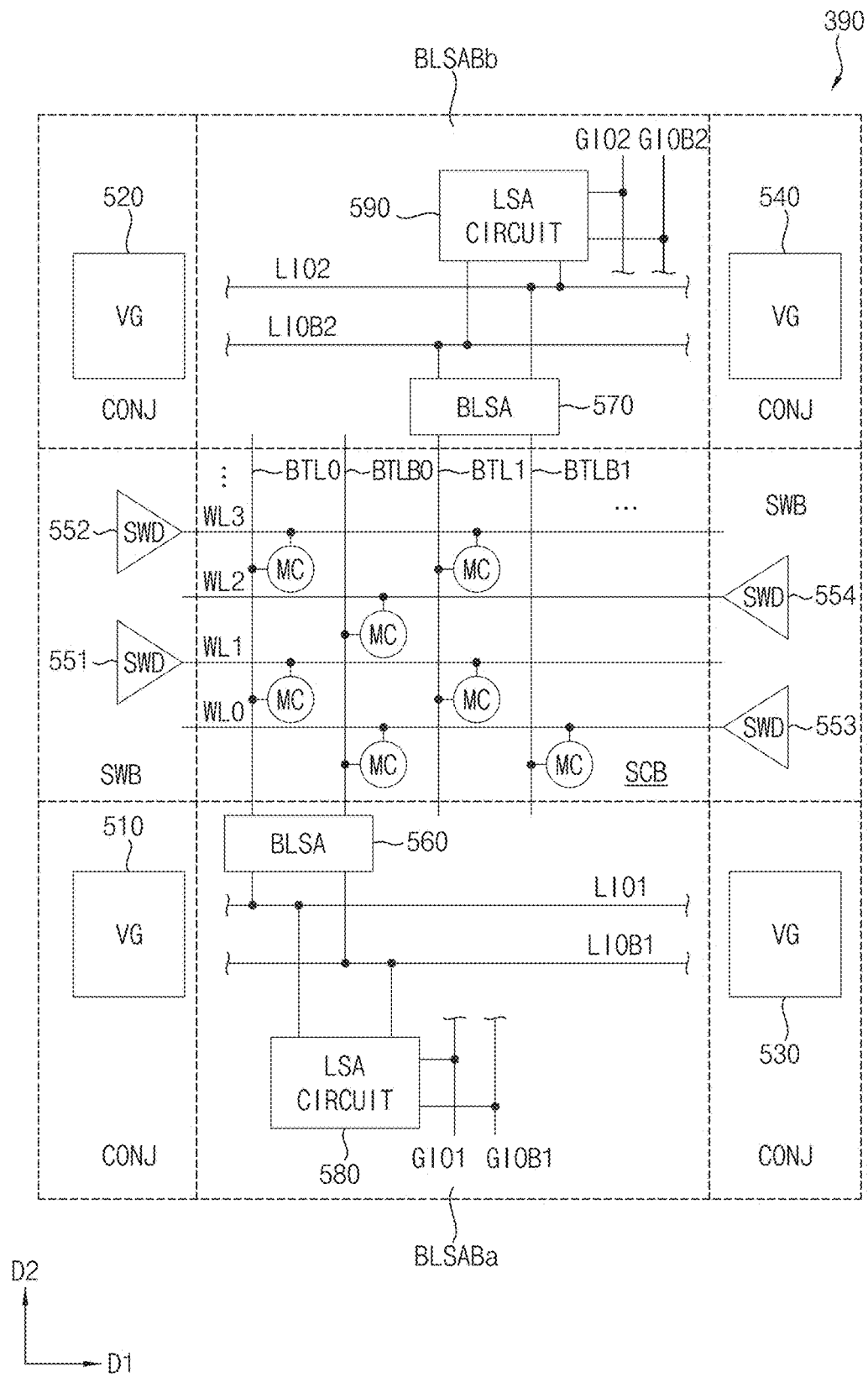
FIG. 8 illustrates at least a portion of the first bank array shown in FIG. 7, according to some example embodiments.

FIG. 8 illustrates a portion 390 of the first bank array 310a in FIG. 7, according to some example embodiments.

Referring to FIGS. 7 and 8, in the portion 390 of the first bank array 310a, the sub-array block SCB, the bit-line sense amplifier regions BLSAB, the sub-word-line driver regions SWB and the conjunction regions CONJ are disposed.

The sub-array block SCB includes a plurality of word-lines WL0~WL3 extending in a row direction (the first direction D1) and a plurality of bit-line pairs BTL0~BTL1 and BTLB0~BTLB1 extending in a column direction (the second direction D2). The sub-array block SCB may include a plurality of memory cells MCs disposed at intersections between the word-lines WL~WL3 and the bit-line pairs BTL0~BTL1 and BTLB0~BTLB1.

With reference to FIG. 8, the sub-word-line driver regions SWB include a plurality of sub-word-line drivers (SWD) 551, 552, 553 and 554 that respectively drive the word-lines WL0~WL3. The sub-word-line drivers 551 and 552 may be disposed in the sub-word-line driver region SWB, which is leftward (in this example), with respect to the sub-array block SCB. In addition, the sub-word-line drivers 553 and 554 may be disposed in the sub-word-line driver region SWB, which is rightward (in this example), with respect to the sub-array block SCB.

The bit-line sense amplifier regions BLSABa and BLSABb may include bit-line sense amplifiers BLSA 560 and 570 coupled to the bit-line pairs BTL0~BTL1 and BTLB0~BTLB, and local sense amplifier (LSA) circuits 580 and 590. The bit-line sense amplifier 560, as part of a differential sensing scheme, may sense and amplify a voltage difference between the bit-line pair BTL0 and BTLB0 to provide the amplified voltage difference to a local I/O line pair LIO1 and LIOB1. The bit-line sense amplifier 570 may sense and amplify a voltage difference between the bit-line pair BTL1 and BTLB1 to provide the amplified voltage difference to a local I/O line pair LIO2 and LIOB2.

The local sense amplifier circuit 580 controls connection between the local I/O line pair LIO1 and LIOB1 and a global I/O line pair GIO1 and GIOB1, and the local sense amplifier circuit 590 controls connection between the local I/O line pair LIO2 and LIO2B and a global I/O line pair GIO2 and GIO2B.

As illustrated in FIG. 8, the bit-line sense amplifiers 560 and 570 may be alternately disposed at an upper portion and a lower portion of the sub-array block SCB. The conjunction regions CONJ may be disposed adjacent to the bit-line sense amplifier regions BLSABa and BLSABb, the sub word-line driver regions SWB and the sub-array block SCB. A plurality of voltage generators (VG) 510, 520, 530 and 540 may be disposed in the conjunction regions CONJ.

Figure 9:
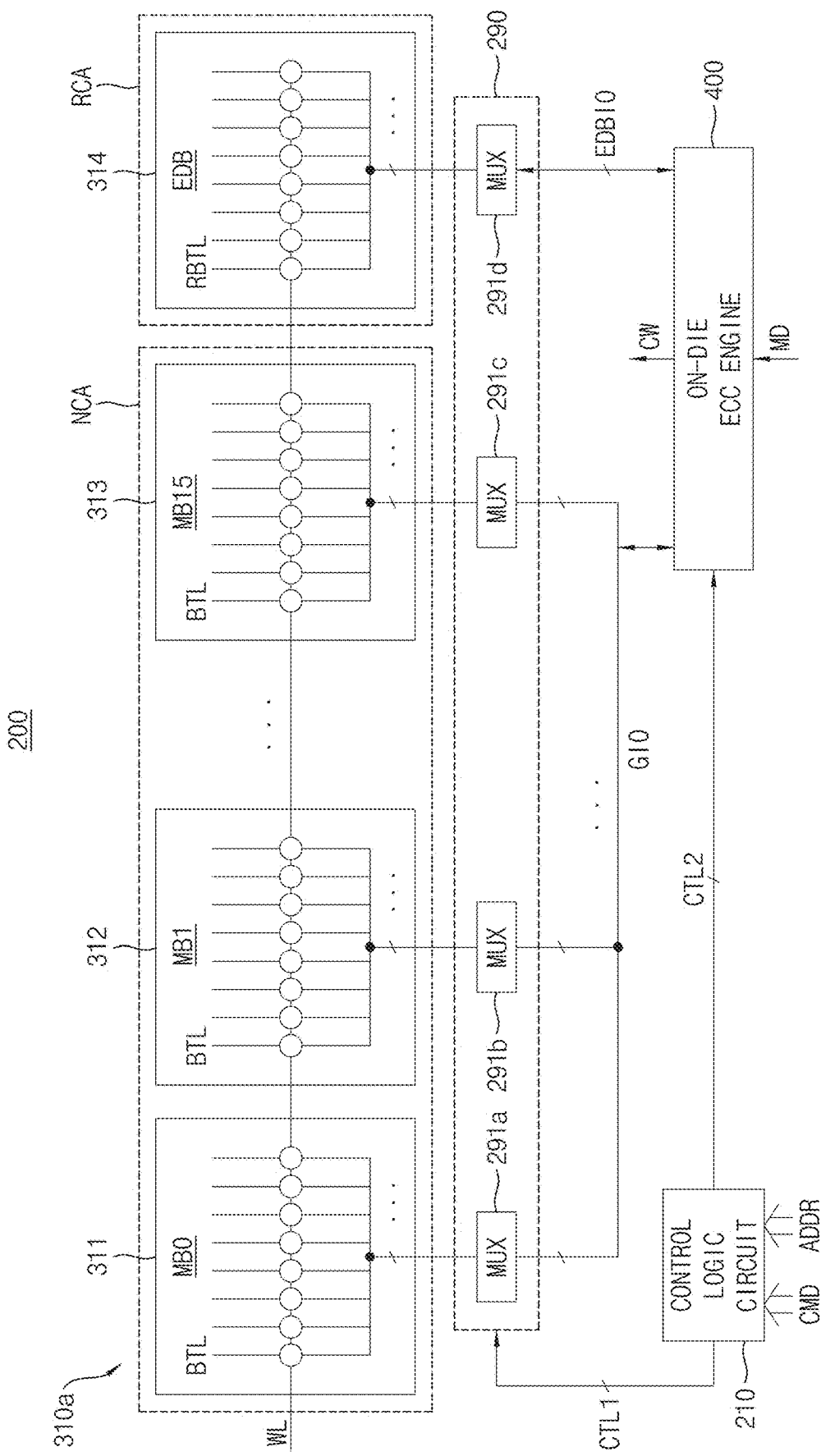
FIG. 9 illustrates at least a portion of the semiconductor memory device of FIG. 5 configured in a write operation.

FIG. 9 illustrates a portion of the semiconductor memory device 200 of FIG. 5 during a write operation, according to one or more embodiments.

In FIG. 9, the control logic circuit 210, the first bank array 310a, the I/O gating circuit 290, and the on-die ECC engine 400 are illustrated.

Referring to FIG. 9, the first bank array 310a may include a normal cell array NCA and a redundancy cell array RCA.

The normal cell array NCA may include a plurality of first memory blocks MB0~MB15, i.e., 311-313, and the redundancy cell array RCA includes at least a second memory block 314. The first memory blocks 311-313 are memory blocks determining a memory capacity of the semiconductor memory device 200. The second memory block 314 is for ECC and/or redundancy repair. Since the second memory block 314 for ECC and/or redundancy repair is used for ECC, data line repair and block repair to repair 'fail' cells generated in the first memory blocks 311-313, the second memory block 314 is also referred to as an EDB block. In each of the first memory blocks 311-313, a plurality of first memory cells are arranged in rows and columns. The first memory cells connected to intersections of the word-lines WL and the bit-lines BTL may be dynamic memory cells. In the second memory block 314, a plurality of second memory cells are arranged in rows and columns. The second memory cells connected to intersections of the word-lines WL and bit-lines RBTL may be dynamic memory cells. Each of the first memory blocks 311~313 and the second memory block 314 may correspond to the sub-array block SCB in FIG. 7.

The I/O gating circuit 290 may include a plurality of switching circuits (e.g., multiplexers (MUX)) 291a~291d respectively connected to the first memory blocks 311~313 and the second memory block 314.

The on-die ECC engine 400 may be connected to the switching circuits 291a~291d through first data lines GIO and second data lines EDBIO. The control logic circuit 210 may receive the command CMD and the address ADDR and may decode the command CMD to generate the first control signal(s) CTL1 to the I/O gating circuit 290 and the second control signal(s) CTL2 to the on-die ECC engine 400.

When the command CMD is a write command, the control logic circuit 210 may provide the second control signal CTL2 to the on-die ECC engine 400 and the on-die ECC engine 400 may perform the ECC encoding on the main data MD to generate parity data associated with the main data MD and may provide the I/O gating circuit 290 with the codeword CW including the main data MD and the parity data. The control logic circuit 210 may provide the first control signal CTL1 to the I/O gating circuit 290 such that the codeword CW is to be stored in a sub-page of the target page in the first bank array 310a.

Figure 10:
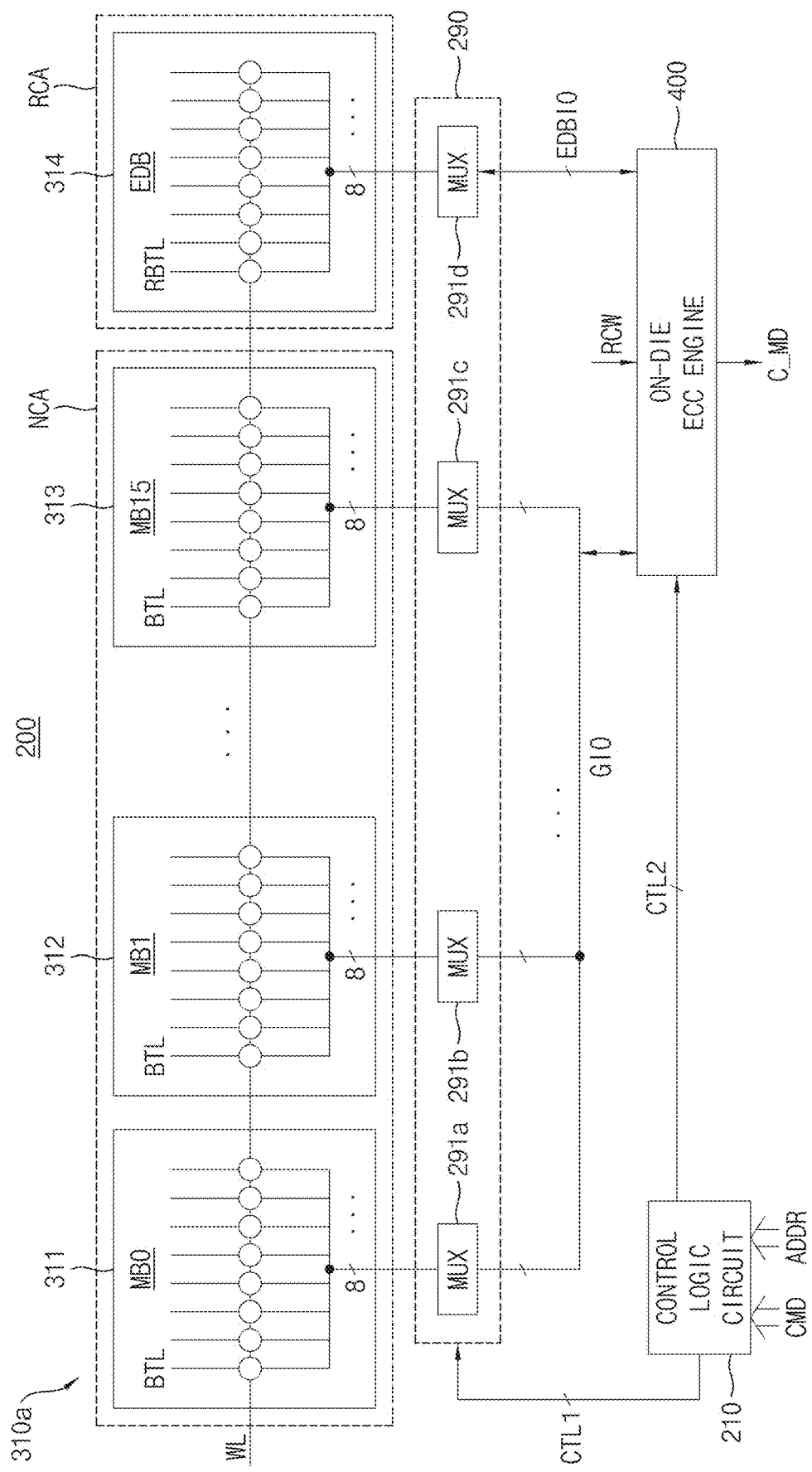
FIG. 10 illustrates at least a portion of the semiconductor memory device of FIG. 5 configured in a read operation.

FIG. 10 illustrates at least a portion of the semiconductor memory device 200 of FIG. 5 during a read operation, according to one or more embodiments.

For convenience of explanation, descriptions repeated with FIG. 9 will be omitted in FIG. 10.

Referring to FIG. 10, when the command CMD is a read command designating a read operation, the control logic circuit 210 may provide the first control signal CTL1 to the I/O gating circuit 290 such that a (read) codeword RCW stored in the sub-page of the target page in the first bank array 310a is provided to the on-die ECC engine 400.

The on-die ECC engine 400 may perform ECC decoding on the read codeword RCW to correct the single bit error, the adjacent two bit errors or the non-adjacent two bit errors in the read codeword RCW by applying different syndromes to the read codeword RCW and outputs the corrected main data C_MD. The different syndromes may be generated from a parity check matrix.

Figure 11:
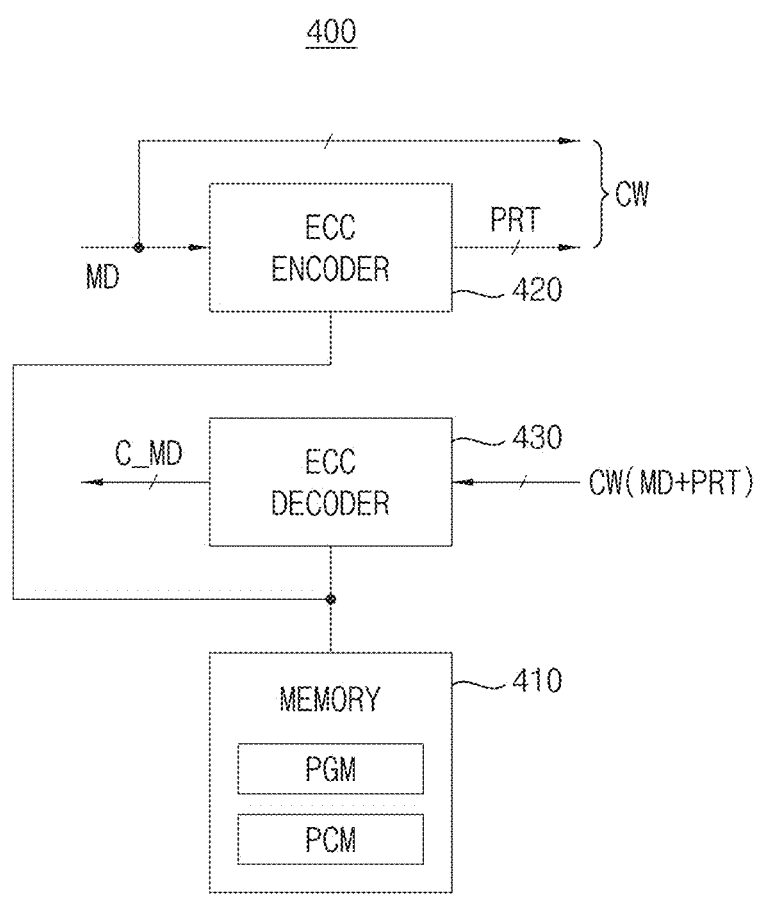
FIG. 11 is a schematic block diagram illustrating an example of an on-die ECC engine in the semiconductor memory device of FIG. 5, according to some example embodiments.

FIG. 11 is a schematic block diagram illustrating an example of the on-die ECC engine 400 in the semiconductor memory device 200 of FIG. 5, according to some example embodiments.

Referring to FIG. 11, the on-die ECC engine 400 may include an (ECC) memory 410, an ECC encoder 420, and an ECC decoder 430.

The ECC memory 410 may store a parity generation matrix PGM and a parity check matrix PCM that are based on an ECC. The parity generation matrix PGM and the parity check matrix PCM may be generated based on a primitive polynomial, and the parity check matrix PCM may include a plurality of column vectors corresponding to data bits in the main data and the parity data. The primitive polynomial may have an alpha matrix as a solution belonging to Galois field, the plurality of column vectors may correspond to results of powers of the alpha matrix and the alpha matrix may have exponent values gradually increasing from zero.

The ECC encoder 420 may be connected to the ECC memory 410, and may perform ECC encoding on the main data MD using the parity generation matrix PGM stored in the ECC memory 410 to generate the parity data PRT in a write operation of the semiconductor memory device 200. The ECC encoder 420 may provide the I/O gating circuit 290 (FIG. 5) with the codeword CW including the main data MD and the parity data PRT.

The ECC decoder 430 may connected to the ECC memory 410, may receive the codeword CW including the main data MD and the parity data PRT, may perform ECC decoding on the main data MD based on the parity data PRT using the parity check matrix PCM to correct and/or detect an error bit in the main data MD, and may output corrected main data C_MD.

Although it is described with reference to FIG. 11 that the ECC memory 410 is coupled to the ECC encoder 420 and the ECC decoder 430, in example embodiments, the ECC memory 410 may be implemented with exclusive OR gates within the ECC encoder 420 and the ECC decoder 430.

FIGS. 12A through 12E illustrate examples of error bits in data patterns stored in a sub-array block according to a least significant bit (LSB) of the row address, respectively, according to one or more embodiments.

Figure 12E:
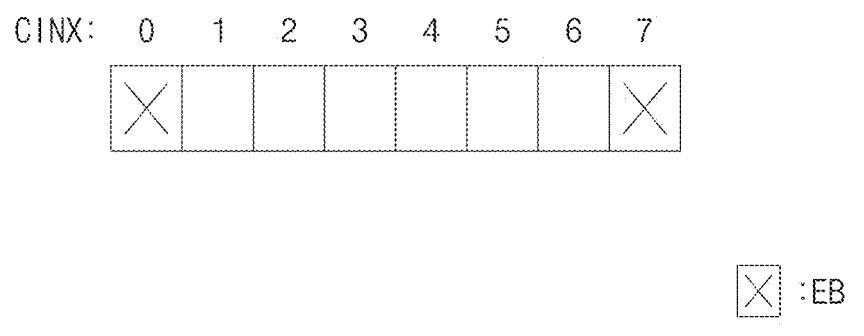

FIGS. 12A and 12C illustrate that a single bit error occurs in a data pattern, respectively, FIGS. 12B and 12D illustrate that adjacent two bit errors occur in adjacent two memory cells, respectively, and FIG. 12E illustrates that non-adjacent two bit errors occur in non-adjacent two memory cells.

In FIGS. 12A through 12E, X denotes an error bit (i.e., an error) in the data pattern.

Referring to FIG. 12A, when the LSB of the row address is a low level (when the row address designates a target page coupled to an even word-line), a memory cell designated by a cell index CINX 1 includes a single bit error. Referring to FIG. 12B, when the LSB of the row address is a low level, each of memory cells designated by cell indexes CINX 4 and 5 includes an error bit. That is, adjacent two bit errors occur in the adjacent two memory cells designated by the cell indexes CINX 4 and 5. In FIG. 12B, adjacent two bit errors do not occur or adjacent two bit errors occur with a low probability in the adjacent two memory cells designated by cell indexes CINX 1 and 2, 2 and 3 and 6 and 7.

Referring to FIG. 12C, when the LSB of the row address is a high level (when the row address designates a target page coupled to an odd word-line), a memory cell designated by a cell index CINX 3 includes a single bit error. Referring to FIG. 12D, when the LSB of the row address is a high level, each of memory cells designated by cell indexes CINX 3 and 4 includes an error bit. That is, adjacent two bit errors occur in the adjacent two memory cells designated by the cell indexes CINX 3 and 4. In FIG. 12D, adjacent two bit errors do not occur or adjacent two bit errors occur with a low probability in the adjacent two memory cells designated by cell indexes CINX 0 and 1, 2 and 3, 4 and 5 and 6 and 7.

Referring to FIG. 12E, when the LSB of the row address is a high level, each of memory cells designated by cell indexes CINX 7 and 0 includes an error bit. That is, non-adjacent two bit errors occur in the non-adjacent two memory cells designated by the cell indexes CINX 7 and 0.

Two bit errors do not occur or two bit error occur with a low probability as illustrated in FIGS. 12B and 12D, because strictures of memory cells in the target page may be different based on the LSB of the row address as described with reference to FIGS. 6 and 8.

FIG. 13 is a table illustrating an example of generating a parity check matrix using a primitive polynomial according to example embodiments.

Referring to FIG. 13, in a table TB, there are illustrated index Vj indicating an exponent of alpha matrix α, alpha matrix $α^{Vj}$ having the index Vj as an exponent and pattern of Galois field $GF(2^5)$ that the alpha matrix $α^{Vj}$ may have based on a primitive polynomial represented by equation 1 below.

$$g(x) = x^5 + x^3 + 1 \quad \text{[equation 1]}$$

When assuming that the alpha matrix α is a solution of equation 1, an equation $-α^5=α^3+1$ is obtained. Therefore, when the index Vj indicating an exponent of the alpha matrix α gradually increases from '0' to '31', the patterns of Galois field $GF(2^5)$ do not overlap when the index Vj has one of '0' to '31'. The pattern of Galois field $GF(2^5)$ in case of the index Vj having '31' is the same as the pattern of Galois field $GF(2^5)$ in case of the index Vj having '0'.

When using the equation of $-α^5=α^3+1$, 31 non-overlapping patterns of Galois field $GF(2^5)$ may be generated as the index Vj indicating the exponent of the alpha matrix α gradually increases from '0' to '31', and a default parity check matrix may be generated based on the 31 non-overlapping patterns of Galois field $GF(2^5)$.

FIG. 14 illustrates an example of an ECC that is generated based on the table TB of FIG. 13, according to example embodiments.

Referring to FIG. 14, ECC may be represented by non-overlapping combinations of alpha matrixes $α^0$, $α^1$, $α^2$, $α^3$ and $α^4$ when the index Vj indicating an exponent of the alpha matrix $α^{Vj}$ gradually increases from '0' to '30', and a default parity check matrix may be generated based on the combinations of alpha matrixes $α^0$, $α^1$, $α^2$, $α^3$ and $α^4$. The alpha matrixes $α^{Vj}$ may correspond to column vectors of the default parity check matrix.

Figure 15:
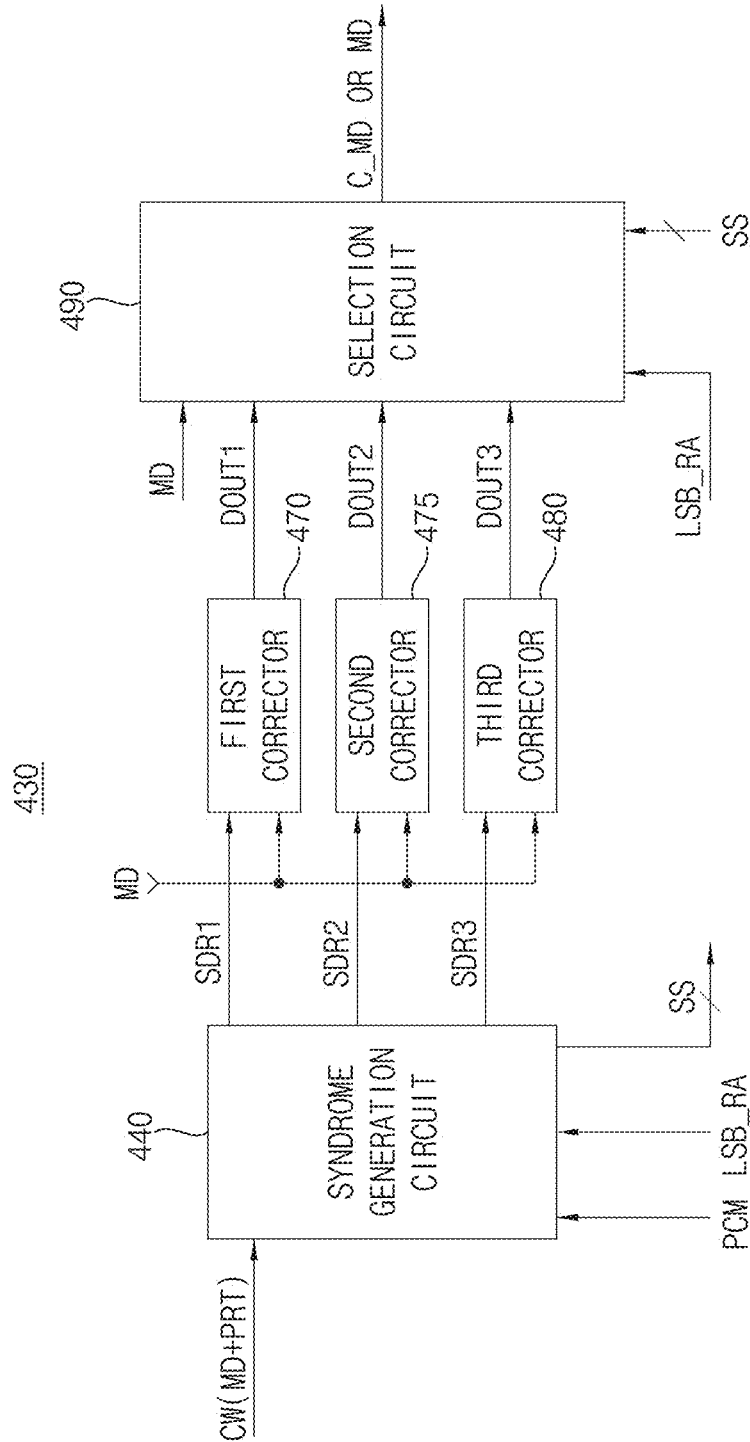
FIG. 15 is a block diagram illustrating an ECC decoder in the on-die ECC engine of FIG. 11, according to some example embodiments.

FIG. 15 is a schematic block diagram illustrating the ECC decoder 430 in the on-die ECC engine 400 of FIG. 11, according to some example embodiments.

Referring to FIG. 15, the ECC decoder 430 may include a syndrome generation circuit 440, a first corrector 470, a second corrector 475, a third corrector 480 and a selection circuit 490.

The syndrome generation circuit 440 may generate a first syndrome SDR1, a second syndrome SDR2 and a third syndrome SDR3 based on the parity check matrix PCM and the read codeword CW and may generate a selection signal SS based on the LSB LSB_RA of the row address and one of the second syndrome SDR2 and the third syndrome SDR3.

The first corrector 470 may correct a single bit error in the main data MD based on the first syndrome SDR1 to provide a first output data DOUT1. The second corrector 475 may correct adjacent two bit errors in the main data MD based on the second syndrome SDR2 to provide a second output data DOUT2, in response to the LSB LSB_RA of the row address being a low level. The third corrector 480 may correct adjacent two bit errors or non-adjacent two bit errors in the main data MD based on the third syndrome SDR3 to provide a third output data DOUT3, in response to the LSB LSB_RA of the row address being a high level.

The selection circuit 490 may receive the main data MD, the first output data DOUT1, the second output data DOUT2 and the third output data DOUT3, and may select one of the main data MD, the first output data DOUT1, the second output data DOUT2 and the third output data DOUT3 based on the selection signal SS and the LSB LSB_RA of the row address to output the corrected main data C_MD or the main data MD.

When a vector representation of the codeword CW stored in the memory cell array 310 corresponds to CV, equation 2 is deduced.

$$CV = WDV \times G, \quad \text{[equation 2]}$$

where, WDV is a vector representation of the main data set MD and G is a vector representation of the parity generation matrix PGM.

When a vector representation of the codeword CW read from the memory cell array 310 corresponds to R, R may include errors and R may be represented by equation 3.

$$R = WDV \times G + E, \quad \text{[equation 3]}$$

where E corresponds to a vector representation of the errors.

The ECC decoder 430 may perform calculation on the read codeword CW with the parity check matrix PCM. When a vector representation of the parity check matrix PCM corresponds to H, a result of the calculation corresponds to equation 4.

$$H \times R^T = H \times (WDV \times G)^T + H \times E^T = H \times G^T \times WDV^T + H \times E^T \quad \text{[equation 4]}$$

The parity generation matrix G and the parity check matrix H are set for satisfying equation 5.

$$H \times G^T = 0 \quad \text{[equation 5]}$$

Therefore, equation 6 is deduced.

$$H \times R^T = H \times E^T \quad \text{[equation 6]}$$

A result of equation 6 may correspond to a vector representation of the first syndrome SDR1.

FIG. 16 illustrates an example of a default parity check matrix according to example embodiments.

Referring to FIG. 16, a default parity check matrix PCMa may be represented by alpha matrixes $\alpha^0, \alpha^1, \alpha^2, \alpha^3, \ldots, \alpha^{q-1}$ having exponent values that gradually (i.e., sequentially) increase from zero. Here, q may be a number of bits in the codeword CW.

FIG. 17 illustrates an example that a single bit error is included in the main data.

Referring to FIG. 17, when a vector representation of the default parity check matrix PCMa corresponds to Ha and when an error vector in case of a single bit error being included in the main data MD corresponds to E1, an error vector E1 may be represented by [0 0 1 0 ... 0].

When a matrix-multiplication operation is performed on the default parity check matrix PCMa and a transposition matrix of the error vector E1, $\alpha^2$ may be obtained.

FIG. 18 illustrates an example that adjacent two bits errors are included in the main data.

Referring to FIG. 18, when a vector representation of the default parity check matrix PCMa corresponds to Ha and when an error vector in case of adjacent two bits errors being included in the main data MD corresponds to E2, an error vector E2 may be represented by [1 1 0 0 ... 0].

When a matrix-multiplication operation is performed on the default parity check matrix PCMa and a transposition matrix of the error vector E2, 1+a may be obtained. When $\alpha^{V_y}$ that is the same as $1+\alpha$ is found in the default parity check matrix PCMa, the adjacent two bits errors may be corrected by a column vector corresponding to $\alpha^{V_y}$.

Figure 19:
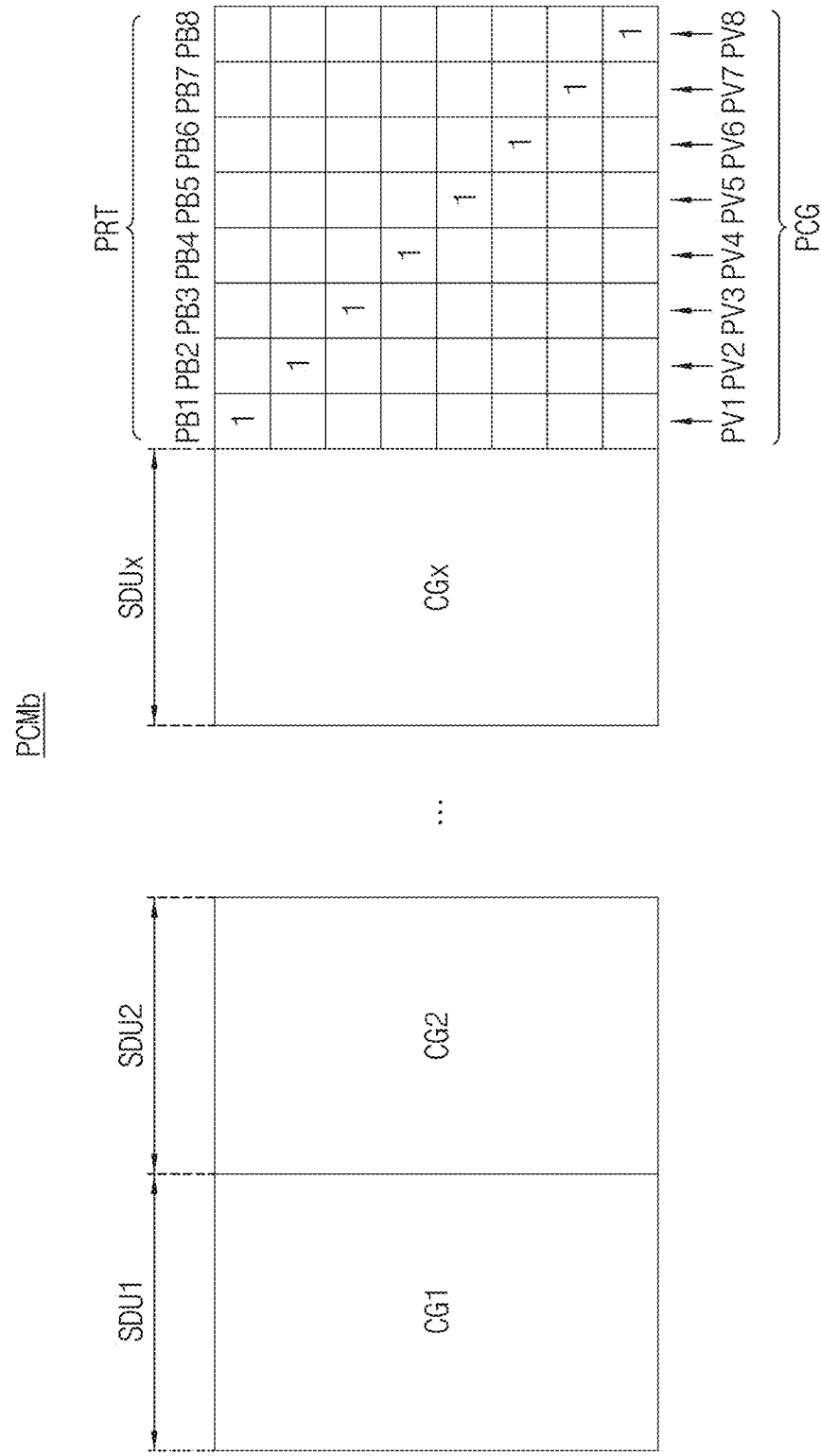
FIG. 19 illustrates an example of a parity check matrix used in the on-die ECC engine of FIG. 11, according to some example embodiments.

FIG. 19 illustrates an example of a parity check matrix used in the on-die ECC engine 400 of FIG. 11, according to some example embodiments.

In FIG. 19, it is assumed that the main data MD includes a plurality of sub-data units SDU1~SDUx, and the parity data PRT includes 8-bit parity bits PB1~PB8. In FIG. 14, it is assumed that x is a natural number equal to or greater than eight.

Referring to FIG. 19, a parity check matrix PCMb that is based on an ECC may be divided into a plurality of code groups CG1~CGx and PCG corresponding to the plurality of sub-data units SDU1~SDUx and the parity data PRT. The code group PCG may include a plurality of column vectors PV1~PV8 corresponding to parity bits PB1~PB8 of the parity data PRT.

Figure 20:
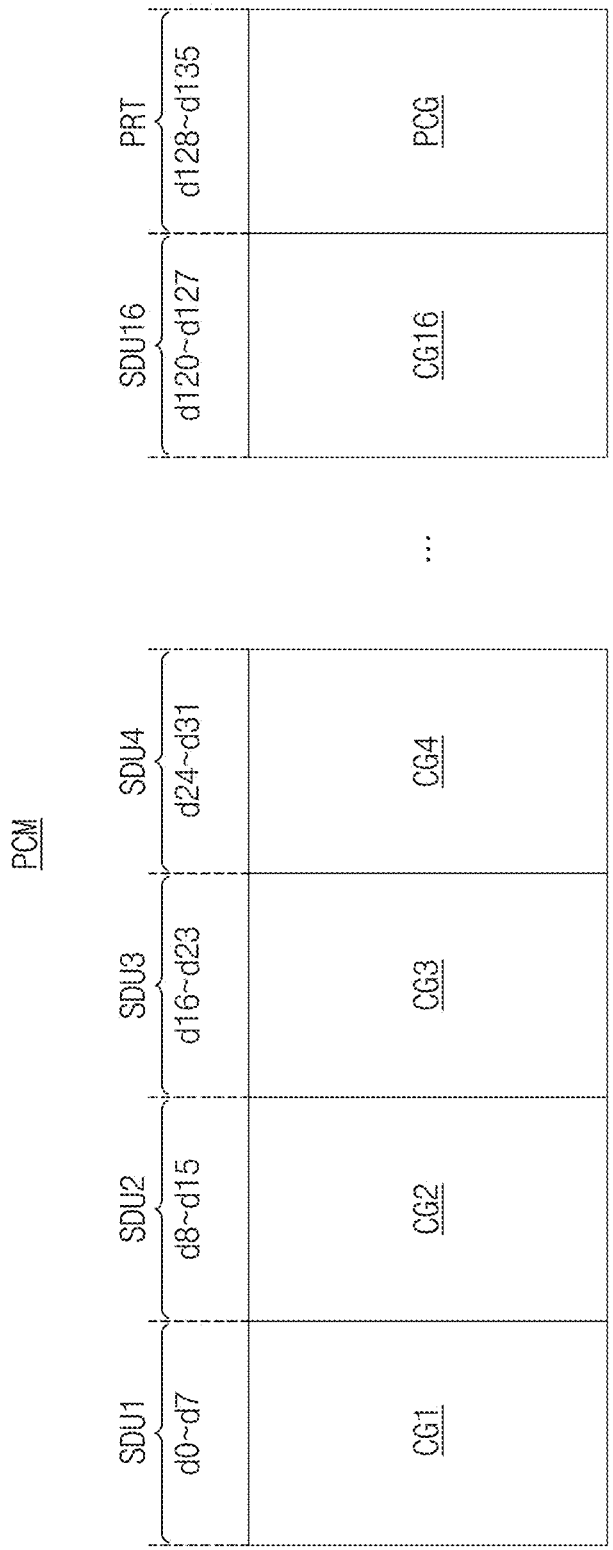
FIG. 20 illustrates an example of the parity check matrix shown in FIG. 19, according to some example embodiments.

FIG. 20 illustrates an example of the parity check matrix PCM shown in FIG. 19, according to some example embodiments.

In FIG. 20, it is assumed that the main data MD includes 128-bit data bits d0~d127 and the parity bits PB1~PB8 correspond to data bits d128~d135. That is, it is assumed that x is eight in FIG. 19.

Referring to FIG. 20, the data bits d0~d127 of the main data MD may be divided into first through sixteenth sub data units SDU1~SDU16. Each of the first through sixteenth sub-data units SDU1~SDU16 includes 8-bit data bits.

The parity check matrix PCM may include first through sixteenth code groups CG1~CG16 corresponding to the first through sixteenth sub-data units SDU1~SDU16, respectively, and the code group PCG corresponding to the parity bits PB1~PB8 (i.e., data bits d128~d135).

FIGS. 21A through 21E illustrate an example configuration of the parity check matrix PCM of FIG. 20, according to one or more embodiments.

Referring to FIGS. 21A through 21E, the parity check matrix PCM may include first through sixteenth code groups CG1~CG16 corresponding to the first through sixteenth sub-data units SDU1~SDU16, respectively, and a code group PCG corresponding to the parity bits PB1~PB8 (i.e., data bits d128~d135).

The first through sixteenth code groups CG1~CG16 may include column vectors CV11~CV18, CV21~CV28, CV31~CV38, CV41~CV48, CV51~CV58, CV61~CV68, CV71~CV78, CV81~CV88, CV91~CV98, CV101~CV108, CV111~CV118, CV121~CV128, CV131~CV138, CV141~CV148, CV151~CV158 and CV161~CV168 and the code group PCG includes column vectors PV1~PV8.

The column vectors CV11~CV18 correspond to the data bits d0~d7. The column vectors CV21~CV28 correspond to the data bits d8~d15. The column vectors CV31~CV38 correspond to the data bits d16~d23. The column vectors CV41~CV48 correspond to the data bits d24~d31. The column vectors CV51~CV58 correspond to the data bits d32~d39. The column vectors CV61~CV68 correspond to the data bits d40~d47. The column vectors CV71~CV78 correspond to the data bits d48~d55. The column vectors CV81~CV88 correspond to the data bits d56~d63. The column vectors CV91~CV98 correspond to the data bits d64~d71. The column vectors CV101~CV108 correspond to the data bits d72~d79. The column vectors CV11~I-CV118 correspond to the data bits d80~d87. The column vectors CV121~CV128 correspond to the data bits d88~d95. The column vectors CV131~CV138 correspond to the data bits d96~d103. The column vectors CV141~CV148 correspond to the data bits d104~d111. The column vectors CV151~CV158 correspond to the data bits d112~d119. The column vectors CV161~CV168 correspond to the data bits d120~d127. The column vectors PV1~PV8 correspond to the data bits d128~d135.

The syndrome generation circuit 440 in FIG. 15 may generate a first sub-check matrix (HS1 in FIG. 26A) and a second sub-check matrix (HS2 in FIG. 26A) by using the column vectors CV11~CV168 and PV1~PV8 of the parity check matrix PCM.

Figure 22A:
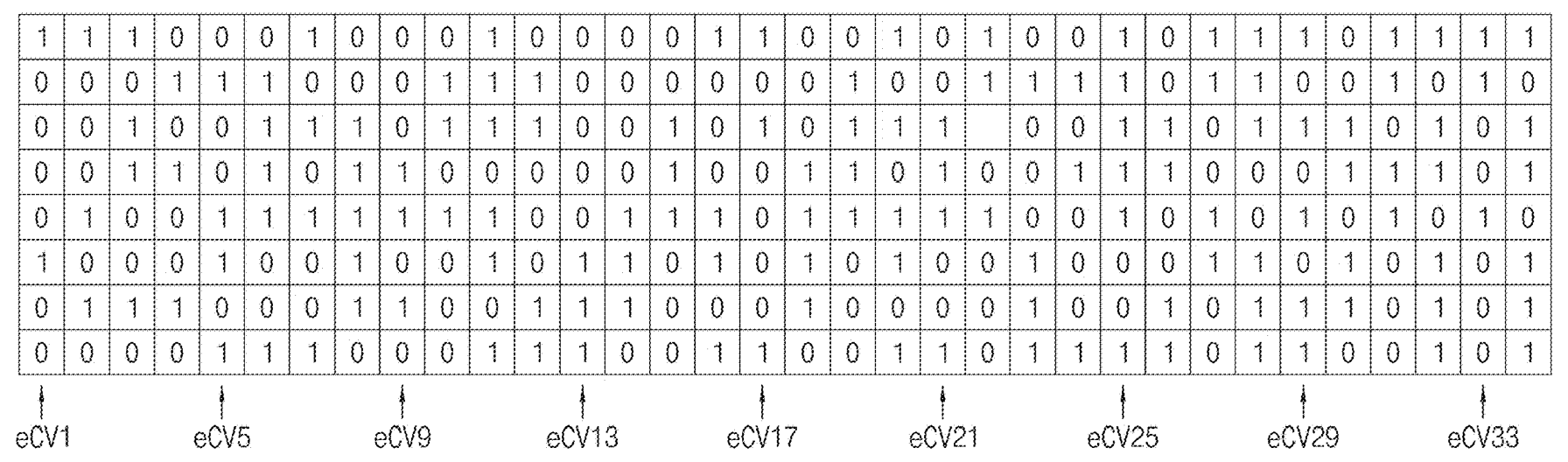

FIGS. 22A and 22B illustrate an example of the first sub-check matrix which is generated by using the parity check matrix, although embodiments are not limited thereto.

The syndrome generation circuit 440 in the ECC decoder 430 (see FIG. 15) may generate the first sub-check matrix (HS1 in FIG. 26A) by using the column vectors CV1~I-

CV168 and PV1~PV8 of the parity check matrix PCM, which is to be applied, when the target page is coupled to an even word-line.

Referring to FIGS. 22A and 22B, the syndrome generation circuit 440 (FIG. 15) may generate the first sub-check matrix HS1 by performing an exclusive-OR operation on adjacent a (2i−1)-th column vector and a (2i)-th column vector among the of column vectors CV11~CV168 and PV1~PV8 in FIGS. 21A through 21E. Here, i is one of 1 to k/2, k being an even number of data bits in each of the sub-data units SDU1~SDU16. The first sub-check matrix HS1 may include even column vectors eCV1-eCV68.

For example, the syndrome generation circuit 440 may generate the even column vector eCV1 by performing an exclusive-OR operation on the column vectors CV11 and CV12 and may generate the even column vector eCV5 by performing an exclusive-OR operation on the column vectors CV21 and CV22.

Figure 23A:
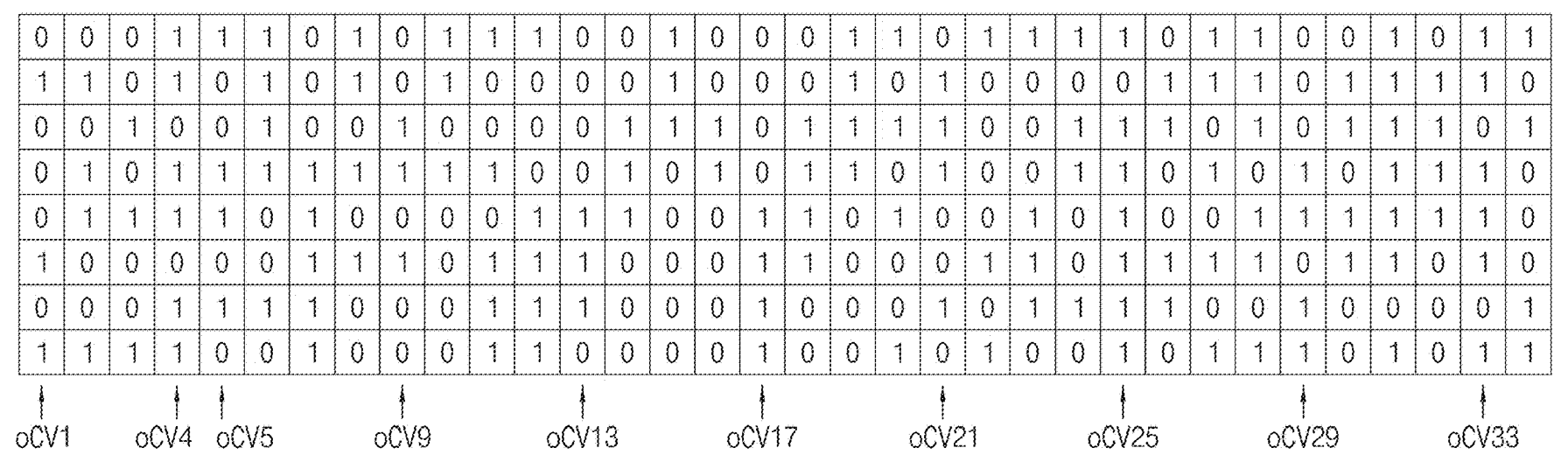
Figure 23B:
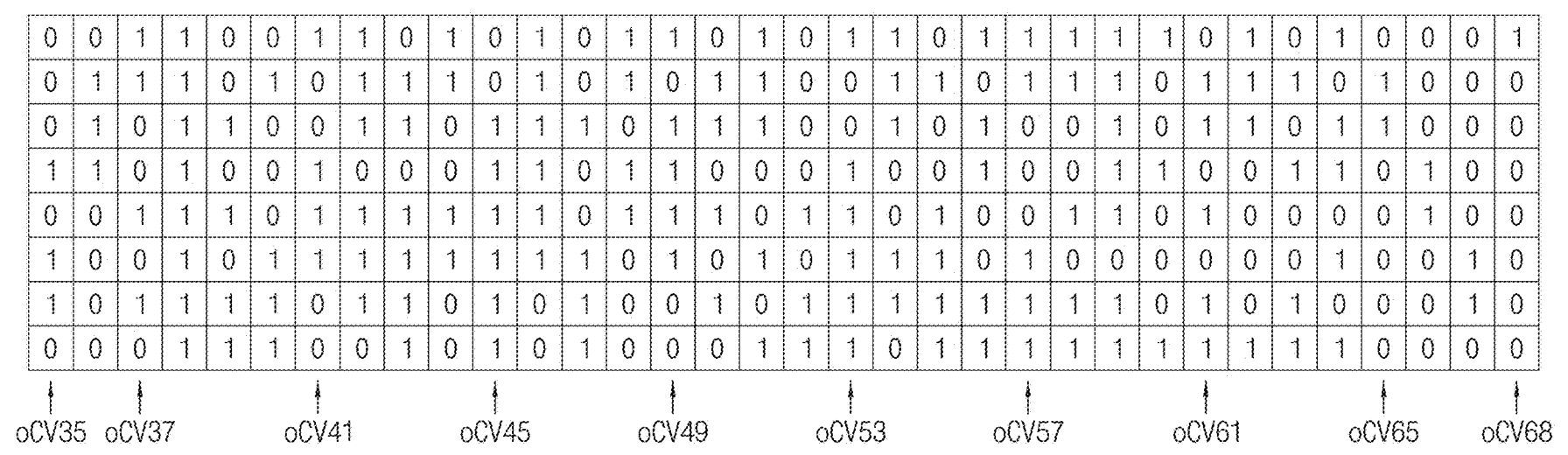

FIGS. 23A and 23B illustrate an example of the second sub-check matrix which is generated by using the parity check matrix, according to one or more embodiments.

The syndrome generation circuit 440 in the ECC decoder 430 (FIG. 15) may generate the second sub-check matrix (HS2) in FIG. 26A) by using the column vectors CV11~CV168 and PV1~PV8 of the parity check matrix HS, which is to be applied, when the target page is coupled to an odd word-line.

Referring to FIGS. 23A and 23B, the syndrome generation circuit 440 may generate the second sub-check matrix HS2 by performing an exclusive-OR operation on adjacent a (2i)-th column vector and a (2i+1)-th column vector among the of column vectors CV11~CV168 and PV1~PV8 in FIGS. 21A through 21E and by performing an exclusive-OR operation on non-adjacent k-th column vector and a first column vector in each of the plurality of sub data units. Here, i is one of 1 to k/2, k being an even number of data bits in each of the sub data units SDU1~SDU16. The second sub check matrix HS2 may include odd column vectors oCV1~oCV68.

For example, the syndrome generation circuit 440 (FIG. 15) may generate the odd column vector oCV1 by performing an exclusive-OR operation on the column vectors CV12 and CV13.

FIGS. 24 and 25 illustrate examples of generating odd column vectors, according to one or more embodiments.

Referring to FIG. 24, the syndrome generation circuit 440 (FIG. 15) may generate the odd column vector oCV4 by performing an exclusive-OR operation on the column vectors CV18 and CV11.

Referring to FIG. 25, the syndrome generation circuit 440 (FIG. 15) may generate the odd column vector oCV68 by performing an exclusive-OR operation on the column vectors PV8 and PV1.

FIG. 26A is a schematic block diagram illustrating an example of the syndrome generation circuit 440 in the ECC decoder 430 of FIG. 15, according to some example embodiments.

Referring to FIG. 26A, the syndrome generation circuit 440 may include a first syndrome generator 445, a sub-check matrix generator 450, a second syndrome generator 460, a third syndrome generator 465, a multiplexer (MUX) 467 and a selection signal generator 468.

The first syndrome generator 445 may generate the first syndrome SDR1 by applying the parity check matrix PCM to the read codeword CW. The sub-check matrix generator 450 may generate the first sub-check matrix HS1 based on a first portion of the parity check matrix PCM as described with reference to FIGS. 22A and 22B and may generate the second sub-check matrix HS2 based on a second portion of the parity check matrix PCM as described with reference to FIGS. 23A and 23B. The second syndrome generator 460 may generate the second syndrome SDR2 by applying the first sub-check matrix HS1 to the read codeword CW. The third syndrome generator 465 may generate the third syndrome SDR3 by applying the second sub-check matrix HS2 to the read codeword CW.

The multiplexer 467 may receive the second syndrome SDR2 and the third syndrome SDR3 and may select one of the second syndrome SDR2 and the third syndrome SDR3 based on the LSB LSB_RA of the row address. The selection signal generator 468 may receive the first syndrome SDR1 and an output of the multiplexer 467 and may generate the selection signal SS based on logic levels of the first syndrome SDR1 and one of the second syndrome SDR2 and the third syndrome SDR3.

If the parity check matrix PCM corresponds to a single error correction (SEC) code, the first syndrome SDR1 and the second syndrome SDR2 cannot have a non-zero value simultaneously and the first syndrome SDR1 and the third syndrome SDR3 cannot have a non-zero value simultaneously. Therefore, when the read codeword CW includes a single bit error, one of the second syndrome SDR2 and the third syndrome SDR3 has non-zero value. In addition, when the read codeword CW does not include error(s), the first syndrome SDR1 and the second syndrome SDR2 have a non-zero value simultaneously or the first syndrome SDR1 and the third syndrome SDR3 have a non-zero value simultaneously. Therefore, the selection signal generator 468 may determine a logic level of the selection signal SS based on the above-mentioned description.

FIG. 26B is an example of a default parity check matrix that is generated based on a primitive polynomial according to example embodiments.

FIG. 26B illustrates a default parity check matrix PCMc that is generated based on a primitive polynomial represented by equation 7 below.

$$g_1(x) = x^8 + x^6 + x^3 + x^2 + 1 \qquad \text{[equation 7]}$$

When assuming that the alpha matrix α is a solution of equation 7, an equation $-\alpha^8 = \alpha^6 + \alpha^3 + \alpha^2 + 1$ is obtained. Therefore, when the index Vj indicating an exponent of the alpha matrix α gradually increases from '0' to '255', the patterns of Galois field $GF(2^8)$ do not overlap when the index Vj has one of '0' to '254'. The pattern of Galois field $GF(2^8)$ in case of the index Vj having '255' is the same as the pattern of Galois field $GF(2^8)$ in case of the index Vj having '0'.

In addition, when the index Vj is 222, an equation $\alpha^{222} = \alpha^7 + 1$ is obtained.

FIG. 26C is a table illustrating candidate primitive polynomials that are used for generating a default parity check matrix according to example embodiments.

Referring to FIG. 26, in a table TB2, there are illustrated candidate primitive polynomials candidate g(x), decimal values of the candidate primitive polynomials candidate g(x), an index Vj indicating an exponent of alpha matrix α, and remainders mod(Vj, 15) obtained by dividing the index Vj by fifteen.

Candidate primitive polynomials $x^8+x^6+x^3+x^2+1$ and $x^8+x^6+x^5+x^3+x^2+1$ having remainder of 8 from among the candidate primitive polynomials candidate g(x) may be used for generating the primitive polynomial and $x^8+x^6+x^3+x^2+1$ is used in FIG. 26A.

FIG. 26D is a schematic block diagram illustrating an example of the syndrome generation circuit in the ECC decoder 430 of FIG. 15, according to some example embodiments.

Referring to FIG. 26D, a syndrome generation circuit 440a may include a first syndrome generator 445a, a check matrix generator 450a, a second syndrome generator 460a, a third syndrome generator 465a, a multiplexer 467a and a selection signal generator 468a.

The check matrix generator 450a may receive the default parity check matrix PCMc, may generate the parity check matrix PCM of FIGS. 21A through 21E with first column vectors having remainders obtained by dividing the results of the powers of the alpha matrix by 2k–1, which are smaller than k (k being a number of the data bits in each of the plurality of sub-data units), from among the plurality of column vectors, and may provide the parity check matrix PCM to the first syndrome generator 445a.

The check matrix generator 450a may generate the first sub-check matrix HS11 of FIGS. 22A and 22B with second column vectors having remainders which are equal to or greater than k, smaller than 2k–1 and are even numbers, from among the plurality of column vectors, and may provide the first sub-check matrix HS11 to the second syndrome generator 460a.

The check matrix generator 450a may generate the second sub-check matrix HS12 of FIGS. 23A and 23B with third column vectors having remainders which are equal to or greater than k, smaller than 2k–1 and are odd numbers, and with column vectors having $1+\alpha^{k-1}$ type from among the plurality of column vectors, and may provide the second sub-check matrix HS12 to the third syndrome generator 465a.

The first syndrome generator 445a may generate a first syndrome SDR11 by applying the parity check matrix PCM to the read codeword CW. The second syndrome generator 460a may generate a second syndrome SDR12 by applying the first sub-check matrix HS11 to the read codeword CW. The third syndrome generator 465a may generate a third syndrome SDR13 by applying the second sub-check matrix HS12 to the read codeword CW.

The multiplexer 467a may receive the second syndrome SDR12 and the third syndrome SDR13 and may select one of the second syndrome SDR12 and the third syndrome SDR13 based on the LSB LSB_RA of the row address. The selection signal generator 468a may receive the first syndrome SDR11 and an output of the multiplexer 467l and may generate the selection signal SS based on logic levels of the first syndrome SDR1 and one of the second syndrome SDR12 and the third syndrome SDR13.

If the parity check matrix PCM corresponds to a single error correction (SEC) code, the first syndrome SDR11 and the second syndrome SDR12 cannot have a non-zero value simultaneously and the first syndrome SDR11 and the third syndrome SDR13 cannot have a non-zero value simultaneously. Therefore, when the read codeword CW includes a single bit error, one of the second syndrome SDR12 and the third syndrome SDR13 has a non-zero value. In addition, when the read codeword CW does not include error(s), the first syndrome SDR11 and the second syndrome SDR12 have a non-zero value simultaneously or the first syndrome SDR11 and the third syndrome SDR13 have a non-zero value simultaneously. Therefore, the selection signal generator 468 may determine a logic level of the selection signal SS based on the above-mentioned description.

When the main data MD provided to the ECC decoder 430 in FIG. 15 includes a single bit error, one of bits of the error vector has a high level and other bits of the error vector are low levels. Therefore, the ECC decoder 430 of FIG. 15 may correct the single bit error in the main data MD based on the first syndrome SDR11.

When the main data MD provided to the ECC decoder 430 in FIG. 15 includes adjacent two-bit errors and the LSB_RA of the row address is low level, the ECC decoder 430 may correct the adjacent two-bit errors in the main data MD based on the second syndrome SDR12 generated by column vectors corresponding to $1+\alpha$.

When the main data MD provided to the ECC decoder 430 in FIG. 15 includes adjacent two-bit errors or non-adjacent two-bit errors (occurring in k-th memory cell and a first memory cell that are not adjacent) and the LSB_RA of the row address is high level, the ECC decoder 430 may correct the adjacent two-bit errors or the non-adjacent two-bit errors in the main data MD based on the third syndrome SDR13 generated by column vectors having remainders which are equal to or greater than k, smaller than 2k–1 and are odd numbers and column vectors having $1+\alpha^{k-1}$ type.

When the non-adjacent two-bit errors are included in the main data MD, a matrix-multiplication operation is performed on the default parity check matrix PCMc and a transposition matrix of the error vector E2, $1+\alpha^7$ may be obtained.

As described with reference to FIG. 26B, $1+\alpha^7$ may correspond to $\alpha^{222}$. The ECC decoder 430 may correct non-adjacent two-bit errors by assigning column vectors having $1+\alpha^7$ to the third syndrome SDR13 from among the column vectors of the default parity check matrix PCMc.

When the non-adjacent two-bit errors occur in the sub-data unit, the ECC decoder 430 may correct the non-adjacent two-bit errors by assigning column vectors having $1+\alpha^7$ to the third syndrome SDR13.

For example, when non-adjacent two-bit errors (data bits d15 and d22) occur in one sub-data unit, equations $\alpha^{15}+\alpha^{22}=\alpha^{15}(1+\alpha^7)=\alpha^{237}$ may be obtained. In addition, when non-adjacent two-bit errors (data bits d30 and d37) occur in one sub-data unit, equations $\alpha^{30}+\alpha^{37}=\alpha^{30}(1+\alpha^7)=\alpha^{252}$ may be obtained. Remainders obtained by dividing 237 and 252 by 15, respectively, correspond to 12. When non-adjacent two-bit errors (k-th data bit and the first data bit) occur in one sub data unit, column vectors for correcting the non-adjacent two-bit errors may be assigned to a corresponding code group by using an equation $1+\alpha^7=\alpha^{222}$.

Figure 27A:
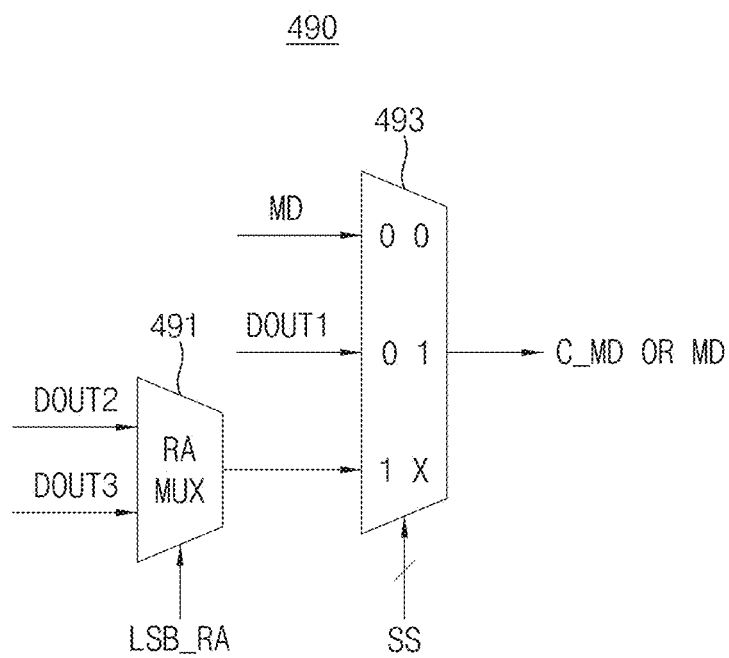
FIG. 27A is a schematic block diagram illustrating an example of a selection circuit in the ECC decoder of FIG. 15, according to some example embodiments.

FIG. 27A is a schematic block diagram illustrating an example of the selection circuit 490 in the ECC decoder of FIG. 15, according to some example embodiments.

Referring to FIG. 27A, the selection circuit 490 may include a first multiplexer 491 and a second multiplexer 493.

The first multiplexer 491 may receive the second output data DOUT2 and the third output data DOUT3 and may select one of the second output data DOUT2 and the third output data DOUT3 in response to the LSB LSB_RA of the row address.

When the target page is coupled to an even word-line, the first multiplexer 491 may provide the second output data DOUT2, and when the target page is coupled to an odd word-line, the first multiplexer 491 may provide the third output data DOUT3. The second multiplexer 493 may receive the main data MD, the first output data DOUT1 and an output of the first multiplexer 491, may select one of the main data MD, the first output data DOUT1 and the output of the first multiplexer 491 in response to the selection signal SS and may output the selected one as the main data MD or the corrected main data C_MD.

Figure 27B:
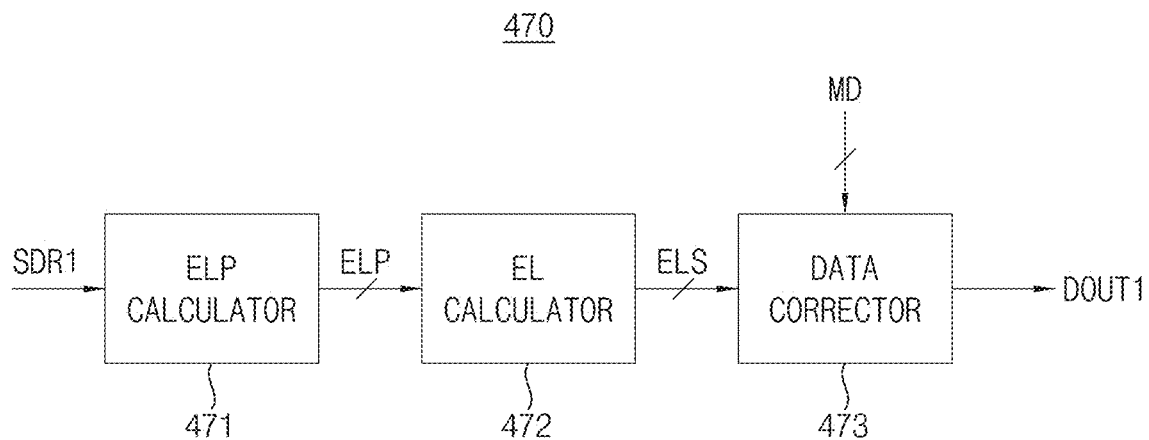
FIG. 27B is a schematic block diagram illustrating an example of a first corrector in the ECC decoder of FIG. 15, according to some example embodiments.

FIG. 27B is a schematic block diagram illustrating an example of the first corrector 470 in the ECC decoder 430 of FIG. 15, according to some example embodiments.

Referring to FIG. 27B, the first corrector 470 may include an error locator polynomial (ELP) calculator 471, an error locator (EL) calculator 472 and a data corrector 473.

The error locator polynomial calculator 471 may calculate coefficients ELP of an error locator polynomial based on the first syndrome SDR1 and provide the coefficients ELP of the error locator polynomial to the error locator calculator 472. The error locator calculator 472 may calculate error locations based on the coefficients ELP of the error locator polynomial and provide the data corrector 473 with an error location signal ELS indicating locations of the errors. The data corrector 473 may correct the single bit error in the main data MD based on the error location signal ELS and provide the first output data DOUT1.

Figure 28:
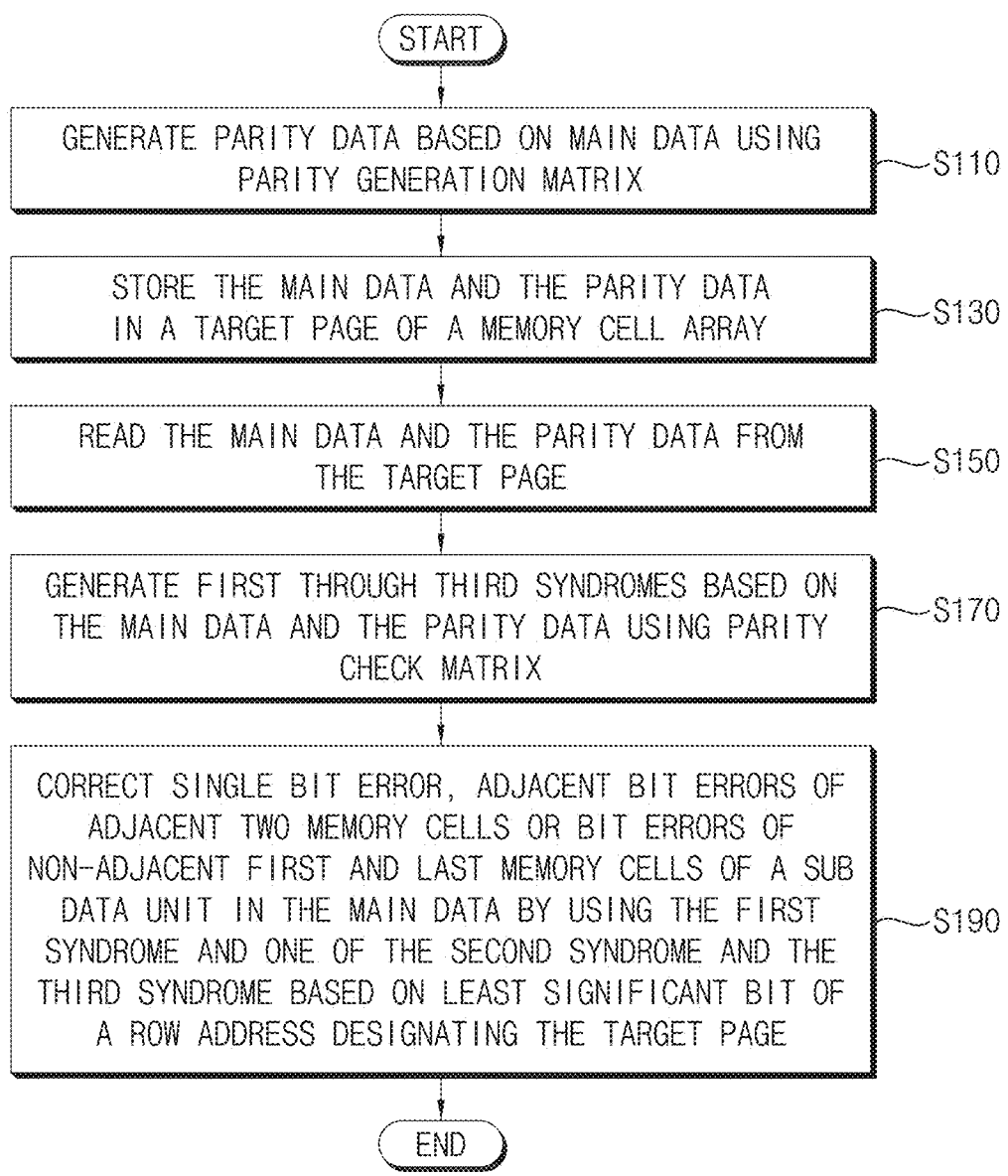
FIG. 28 is a flow chart illustrating a method of operating a semiconductor memory device, according to some example embodiments.

FIG. 28 is a flow chart illustrating a method of operating a semiconductor memory device according to some example embodiments.

Referring to FIGS. 5 through 28, in a method of operating a semiconductor memory device 200 including a memory cell array 310, an on-die ECC engine 400 generates parity data PRT based on the main data MD, by using a parity generation matrix PGM that is based on an ECC (operation S110).

The on-die ECC engine 400 stores the main data MD and the parity data PRT in a target page of the memory cell array 300 via an I/O gating circuit 290 (operation S130). The on-die ECC engine 400 reads the main data MD and the parity data PRT from the target page of the memory cell array 300 via the I/O gating circuit 290 (operation S150).

The on-die ECC engine 400 generates a first syndrome SDR1, a second syndrome SDR2 and a third syndrome SDR3 based on the main data MD, by using a parity check matrix PCM that is based on the ECC (operation S170). The parity check matrix PCM may include a plurality of column vectors and the plurality of column vectors may be divided into a plurality of code groups corresponding to a plurality of sub-data units in the main data and a parity data.

The on-die ECC engine 400 corrects a single bit error in the main data MD or adjacent two bit errors in the main data MD, which occur in adjacent two memory cells or adjacent two bit errors (occurring in last memory cell and the first memory cell of the sub data unit) in the main data MD by using the first syndrome SDR1 and one of the second syndrome SDR2 and the third syndrome SDR3, which is selected based on a LSB of the row address designating the target page (operation S190).

Therefore, the on-die ECC engine 400 and the semiconductor memory device 200 including the on-die ECC engine 400 may correct the single bit error, the adjacent two bit errors or the non-adjacent two bit errors by applying different syndromes to the single bit error and the two bit errors by using one parity check matrix, and thus may increase efficiency of error correcting.

Figure 29:
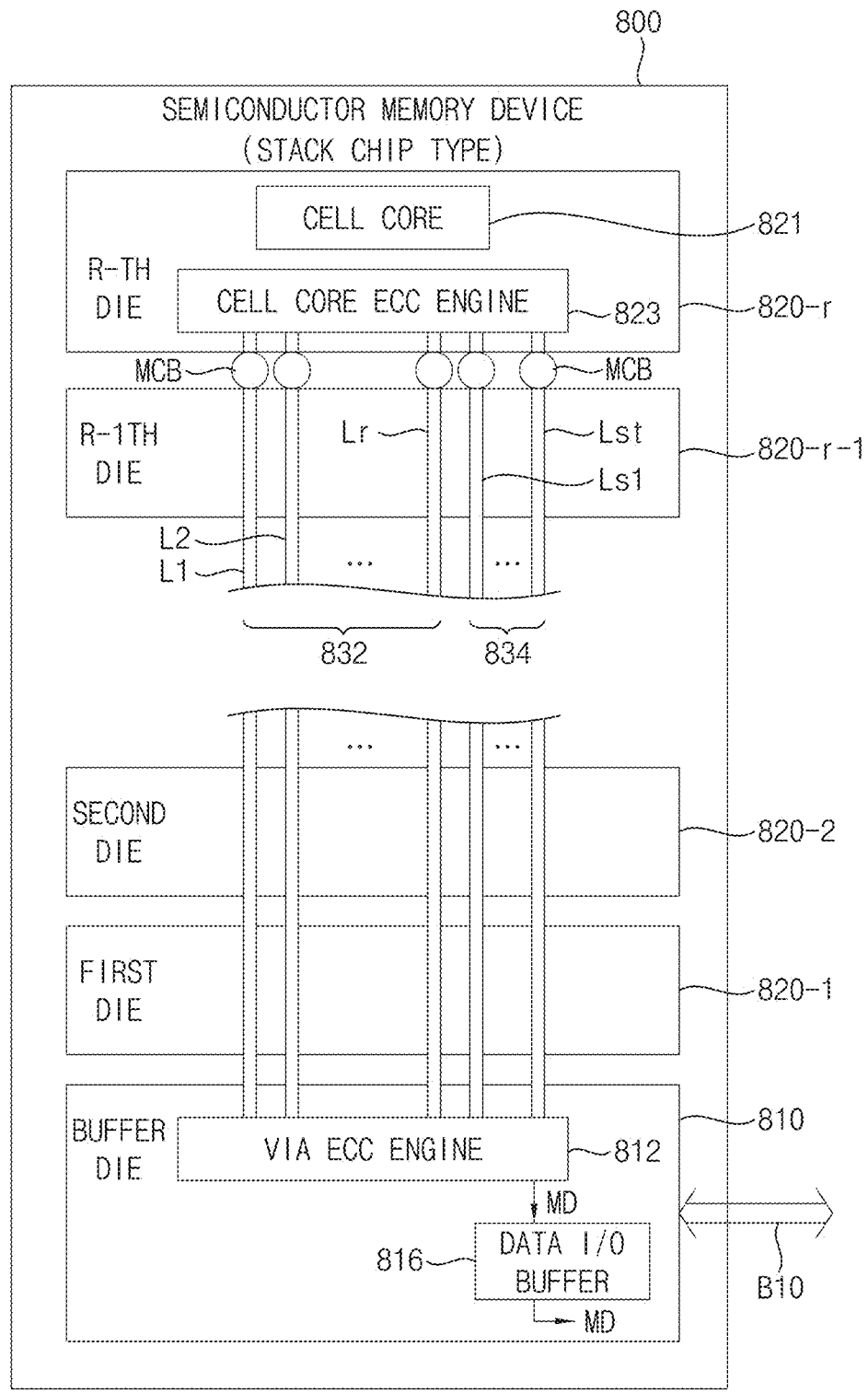
FIG. 29 is a block diagram illustrating a semiconductor memory device according to some example embodiments.

FIG. 29 is a schematic block diagram illustrating a semiconductor memory device 800, according to some example embodiments.

Referring to FIG. 29, the semiconductor memory device 800 may include at least one buffer die 810 and a plurality of memory dies 820-1 to 820-r (r is a natural number equal to or greater than three) providing a soft error analyzing and correcting function in a stacked chip structure.

The plurality of memory dies 820-1 to 820-r are stacked on the buffer die 810 and convey data through a plurality of through silicon via (TSV) lines.

Each of the plurality of memory dies 820-1 to 820-r may include a cell core 821 to store data, and a cell core ECC engine 823 which generates transmission parity bits (i.e., transmission parity data) based on transmission data to be sent to the at least one buffer die 810. The cell core 821 may include a plurality of memory cells having DRAM cell structure. The cell core ECC engine 823 may employ the on-die ECC engine 400 of FIG. 11. Therefore, the cell core ECC engine 823 may correct the single bit error, the adjacent two bit errors or the non-adjacent two bit errors by applying different syndromes to the single bit error and the two bit errors by using one parity check matrix, and thus may increase efficiency of error correcting.

The buffer die 810 may include a via ECC engine 812 which corrects a transmission error using the transmission parity bits when a transmission error is detected from the transmission data received through the TSV lines and generates error-corrected data.

The buffer die 810 may further include a data I/O buffer 816. The data I/O buffer 816 may temporarily store the main data MD from the via ECC engine 812 and may output the main data MD to an outside.

The semiconductor memory device 800 may be a stack chip type memory device or a stacked memory device which conveys data and control signals through the TSV lines. The TSV lines may be also called 'through electrodes'.

The cell core ECC engine 823 may perform error correction on data which is outputted from the r-th memory die 820-r before the transmission data is sent.

A data TSV line group 832 which is formed at one memory die 820-p may include TSV lines L1, L2, . . . , Lr, and a parity TSV line group 834 may include TSV lines Ls1 to Lst (s is a natural number and t is a natural number greater than one). The TSV lines L1, L2, . . . , Lr of the data TSV line group 832 and the parity TSV lines Ls1 to Lst of the parity TSV line group 834 may be connected to micro bumps MCB (e.g., solder bumps, C4 connections, etc.) which are correspondingly formed among the memory dies 820-1 to 820-r.

The semiconductor memory device 800 may have a three-dimensional (3D) chip structure or a 2.5D chip structure to communicate with an external host (not explicitly shown) through a data bus B10. The buffer die 810 may be connected with the memory controller through the data bus B10.

According to example embodiments, as illustrated in FIG. 29, the cell core ECC engine 823 may be included in the memory die, the via ECC engine 812 may be included in the buffer die. Accordingly, it may be possible to detect and correct soft data fail. The soft data fail may include a transmission error which is generated due to noise when data is transmitted through TSV lines.

Figure 30:
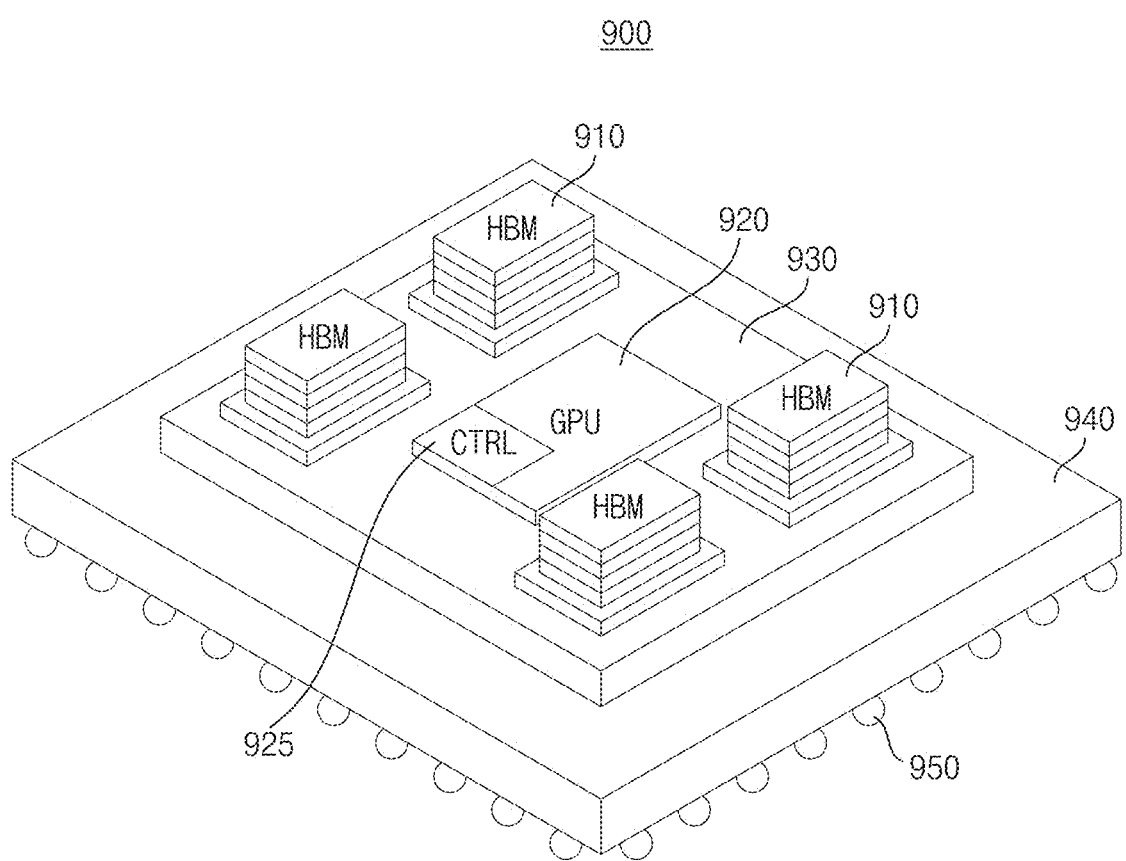
FIG. 30 is a configuration diagram illustrating a semiconductor package including a stacked memory device, according to example embodiments.

FIG. 30 is a perspective view of a configuration diagram illustrating a semiconductor package 900 including the stacked memory device, according to example embodiments.

Referring to FIG. 30, the semiconductor package 900 may include one or more stacked memory devices 910 and a graphic processing unit (GPU) 920.

The stacked memory devices 910 and the GPU 920 may be mounted on an interposer 930, and the interposer on which the stacked memory device 910 and the GPU 920 are mounted may be mounted on a package substrate 940 mounted on solder balls 950. The GPU 920 may correspond to a semiconductor device which may perform a memory control function, and for example, the GPU 920 may be implemented as an application processor (AP). The GPU 920 may include a memory controller CTRL 925.

The stacked memory device 910 may be implemented in various forms, and the stacked memory device 910 may be a memory device in a high bandwidth memory (HBM) form in which a plurality of layers are stacked. Accordingly, the stacked memory device 910 may include a buffer die and a plurality of memory dies and each of the plurality of memory dies include a cell core and a cell core ECC engine described above.

The plurality of stacked memory devices 910 may be mounted on the interposer 930, and the GPU 920 may communicate with the plurality of stacked memory devices 910. For example, each of the stacked memory devices 910 and the GPU 920 may include a physical region, and communication may be performed between the stacked memory devices 910 and the GPU 920 through the physical regions. Meanwhile, when the stacked memory device 910 includes a direct access region, a test signal may be provided into the stacked memory device 910 through conductive means (e.g., solder balls 950) mounted under package substrate 940 and the direct access region.

Figure 31:
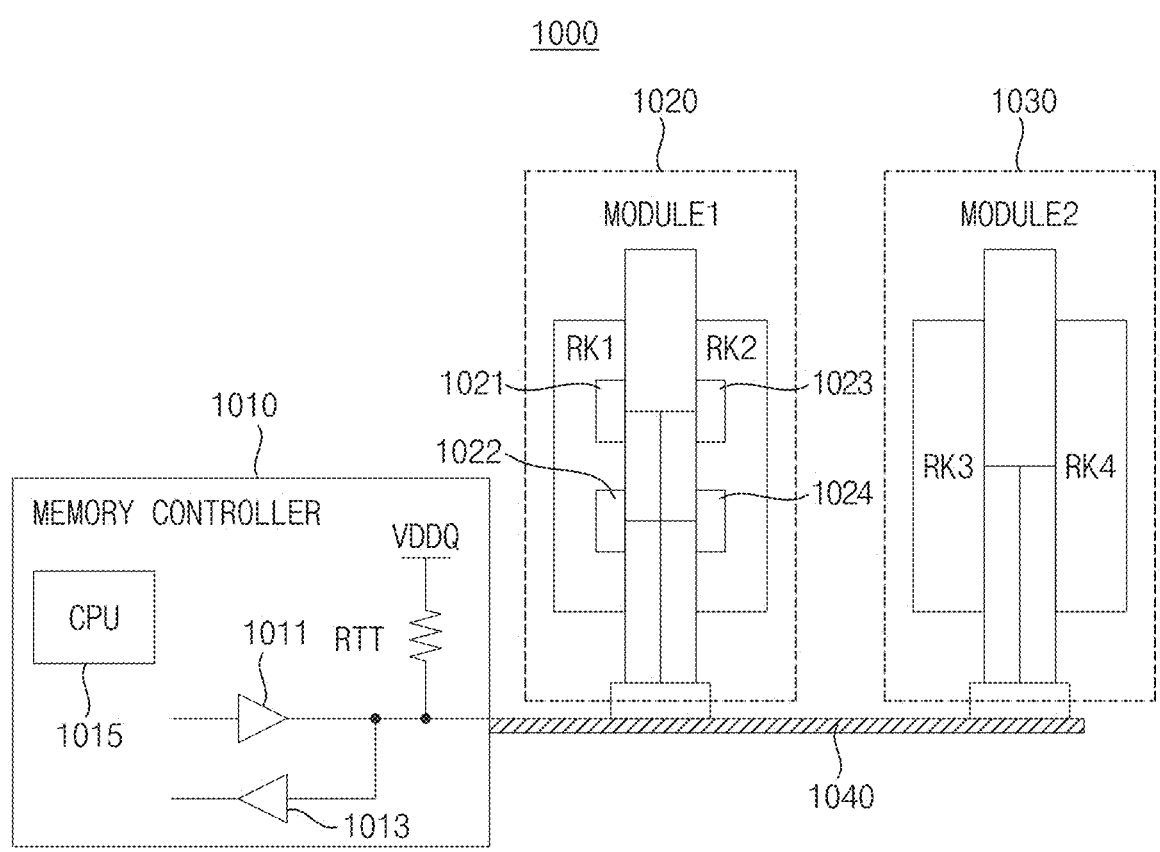
FIG. 31 is a schematic block diagram illustrating a memory system having quad-rank memory modules, according to example embodiments.

FIG. 31 is a schematic block diagram illustrating at least a portion of a memory system 1000 having quad-rank memory modules, according to example embodiments.

Referring to FIG. 31, the memory system 1000 may include a memory controller 1010 and/or memory modules 1020 and 1030. While two memory modules are depicted in FIG. 31, more or fewer memory modules may be included in the memory system 1000, according to some example embodiments.

The memory controller 1010 may control a memory module 1020 and/or 1030 so as to perform a command supplied from a processor and/or host. The memory controller 1010 may be implemented using processing circuitry (e.g., a processor) and/or may be implemented with a host, an application processor or a system-on-a-chip (SoC). For signal integrity, a source termination may be implemented with a resistor RTT on a bus 1040 of the memory controller 1010. The resistor RTT may be coupled to a power supply voltage VDDQ. The memory controller 1010 may include a transmitter 1011, which may transmit a signal to at least one of the memory modules 1020 and/or 1030 (via the bus 1040), and a receiver 1013 that may receive a signal from at least one of the memory modules 1020 and/or 1030 (via the bus 1040). The memory controller 1010 may include a CPU 1015.

The memory modules 1020 and 1030 may be referred to as a first memory module 1020 and a second memory module 1030. The first memory module 1020 and the second memory module 1030 may be coupled to the memory controller 1010 through the bus 1040. Each of the first memory module 1020 and the second memory module 1030 may include a plurality of semiconductor memory devices and/or a registered clock driver. The first memory module 1020 may include memory ranks RK1 and RK2, and the second memory module 1030 may include memory ranks RK3 and RK4.

The memory rank RK1 may include semiconductor memory devices 1021 and 1022 and the memory rank RK2 may include semiconductor memory devices 1023 and 1024. Although not illustrated, each of the memory ranks RK3 and RK4 may include semiconductor memory devices. Each of the semiconductor memory devices 1021, 1022, 1023 and 1024 may employ the semiconductor memory device 200 of FIG. 3.

Each of the semiconductor memory devices 1021, 1022, 1023 and 1024 may be connected to the memory controller 1010 through the bus 1040.

Each of the semiconductor memory devices 1021, 1022, 1023 and 1024 may include a memory cell array and an on-die ECC engine (e.g., on-die ECC engine 400 shown in FIG. 11).

Accordingly, the on-die ECC engine in the semiconductor memory device according to example embodiments may correct the single bit error, the adjacent two bit errors or the non-adjacent two bit errors by applying different syndromes to the single bit error and the two bit errors by using one parity check matrix, and thus may increase efficiency of error correcting.

Aspects of the present disclosure may be applied to systems using semiconductor memory devices that employ volatile memory cells. For example, aspects of the present inventive concept may be applied to systems such as be a smart phone, a navigation system, a notebook computer, a desk top computer and a game console that use the semiconductor memory device as a working memory.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. An error correction code (ECC) engine of a semiconductor memory device, the ECC engine comprising:
    an ECC encoder configured to generate parity data based on main data as a function of an ECC based on a primitive polynomial and configured to store a codeword including the main data and the parity data in a target page of a memory cell array; and
    an ECC decoder configured:
        to read the codeword from the target page based on an address;
        to generate different syndromes based on a parity check matrix; and
        to correct at least one error bit in the read codeword based on at least one of the different syndromes by applying respective different syndromes to a single bit error in the read codeword, adjacent bit errors occurring in adjacent memory cells in the target page and non-adjacent bit errors occurring in non-adjacent memory cells in the target page,
    wherein the parity check matrix is based on a default parity check matrix that is generated as a function of the primitive polynomial, and
    wherein the primitive polynomial has an alpha matrix as a solution belonging to a Galois field.

2. The ECC engine of claim 1, wherein:
    the main data includes a plurality of sub-data units, each of the plurality of sub-data units including a plurality of data bits;
    the default parity check matrix includes a plurality of column vectors divided into a plurality of code groups corresponding to the plurality of sub-data units and the parity data;

the plurality of column vectors correspond to results of powers of the alpha matrix; and the alpha matrix has exponent values gradually increasing from zero.

3. The ECC engine of claim 2, wherein each of the plurality of column vectors has elements to which the primitive polynomial is applied to each of the results of the powers of the alpha matrix.

4. The ECC engine of claim 3, wherein the ECC decoder is further configured:
to generate the parity check matrix with first column vectors having remainders obtained by dividing the results of the powers of the alpha matrix by 2k−1, from among the plurality of column vectors, the remainders being smaller than k, k being a number of the data bits in each of the plurality of sub-data units;
to generate a first sub-check matrix with second column vectors having remainders obtained by dividing the results of the powers of the alpha matrix by 2k−1, from among the plurality of column vectors, the remainders being equal to or greater than k, being smaller than 2k−1 and being even numbers; and
to generate a second sub-check matrix with third column vectors having remainders obtained by dividing the results of the powers of the alpha matrix by 2k−1 and with column vectors having 1+αk−1 type, from among the plurality of column vectors, the remainders being equal to or greater than k, being smaller than 2k−1 and being odd numbers, α being the alpha matrix.

5. The ECC engine of claim 4, wherein the ECC decoder is further configured:
to generate a first syndrome of the different syndromes by applying the parity check matrix to the read codeword;
to generate a second syndrome of the different syndromes by applying the first sub-check matrix to the read codeword in response to a least significant bit (LSB) of a row address of the address being a low level; and
to generate a third syndrome of the different syndromes by applying the second sub-check matrix to the read codeword in response to the LSB of the row address being a high level.

6. The ECC engine of claim 5, wherein the ECC decoder is further configured:
to correct the single bit error in the main data based on the first syndrome;
to correct the adjacent bit errors based on the second syndrome in response to the target page being even-numbered; and
to correct the adjacent bit errors or the non-adjacent bit errors based on the third syndrome in response to the target page being odd-numbered.

7. The ECC engine of claim 5, wherein the ECC decoder is further configured to correct the adjacent bit errors by using a column vector corresponding to 1+α type from among the plurality of column vectors.

8. The ECC engine of claim 5, wherein the ECC decoder is configured to correct the non-adjacent bit errors by using a column vector having the 1+αk−1 type from among the plurality of column vectors.

9. The ECC engine of claim 1, wherein:
the main data includes a plurality of sub-data units, each of the plurality of sub-data units including a plurality of data bits; and
the parity check matrix includes a plurality of column vectors divided into a plurality of code groups corresponding to the plurality of sub-data units and the parity data, and wherein the ECC decoder is configured:
to generate a first syndrome by applying the parity check matrix to the codeword;
to generate a second syndrome by applying a first sub-check matrix to the codeword in response to a least significant bit (LSB) of a row address of the address being a low level, the first sub-check matrix being generated as a function of the parity check matrix; and
to generate a third syndrome by applying a second sub-check matrix different from the first sub-check matrix to the codeword in response to the LSB of the row address being a high level, the second sub-check matrix being generated as a function of the parity check matrix.

10. The ECC engine of claim 9, wherein the ECC decoder is further configured:
to correct the single bit error in the main data based on the first syndrome;
to correct the adjacent bit errors based on the second syndrome in response to the target page being even-numbered; and
to correct the adjacent bit errors or the non-adjacent bit errors based on the third syndrome in response to the target page being odd-numbered.

11. The ECC engine of claim 9, wherein the ECC decoder is further configured:
to generate the first sub-check matrix by performing an exclusive-OR operation on a (2i−1)-th column vector and a (2i)-th column vector of the plurality of column vectors, where i is one of 1 to k/2, k being an even number of the data bits in each of the plurality of sub-data units; and
to apply the first sub-check matrix to the main data in the read codeword in response to the LSB of the row address of the address being a low level.

12. The ECC engine of claim 9, wherein the ECC decoder is further configured:
to generate the second sub-check matrix by performing an exclusive-OR operation on a (2i)-th column vector and a (2i+1)-th column vector of the plurality of column vectors and by performing an exclusive-OR operation on non-adjacent k-th column vector and a first column vector in each of the plurality of sub-data units, where i is one of 1 to k/2−1, k being an even number of the data bits in each of the plurality of sub-data units; and
to apply the second sub-check matrix to the main data in the read codeword in response to the LSB of the row address of the address being a high level.

13. The ECC engine of claim 1, wherein the ECC decoder includes:
a syndrome generation circuit configured to generate a first syndrome, a second syndrome and a third syndrome based on the parity check matrix and the read codeword, and configured to generate a selection signal based on the first syndrome, a least significant bit (LSB) of a row address of the address and one of the second syndrome and the third syndrome;
a first corrector configured to provide a first output data by correcting the single bit error in the main data based on the first syndrome;
a second corrector configured to provide a second output data by correcting the adjacent bit errors in the main data based on the second syndrome in response to the LSB of the row address;
a third corrector configured to provide a third output data by correcting the adjacent bit errors or the non-adjacent bit errors in the main data based on the third syndrome in response to the LSB of the row address being a high level; and a selection circuit configured to select one of the main data, the first output data, the second output data and the third output data in response to the selection signal and the LSB of the row address and to provide a corrected main data or the main data.

14. The ECC engine of claim 13, wherein the syndrome generation circuit includes:

a first syndrome generator configured to generate the first syndrome by applying the parity check matrix to the read codeword;

a sub-check matrix generator configured to generate a first sub-check matrix based on a first portion of the parity check matrix and configured to generate a second sub-check matrix based on a second portion of the parity check matrix;

a second syndrome generator configured to generate the second syndrome by applying the first sub-check matrix to the read codeword;

a third syndrome generator configured to generate the third syndrome by applying the second sub-check matrix to the read codeword;

a multiplexer configured to select one of the second syndrome and the third syndrome based on the LSB of the row address; and a selection signal generator configured to generate the selection signal based on the first syndrome and an output of the multiplexer.

15. A semiconductor memory device, comprising:

a memory cell array including a plurality of volatile memory cells connected to a plurality of word-lines and a plurality of bit-lines;

an error correction code (ECC) engine configured:
to generate parity data based on main data as a function of an ECC based on a primitive polynomial;
to store a codeword including the main data and the parity data in a target page of the memory cell array;
to read the codeword from the target page based on an address to generate a syndrome;
to generate different syndromes based on a parity check matrix; and
to correct at least one error bit in the read codeword based on at least one of the different syndromes by applying respective different syndromes to a single bit error in the read codeword, adjacent bit errors occurring in adjacent memory cells in the target page and non-adjacent bit errors occurring in non-adjacent memory cells in the target page; and a control logic circuit configured to control the ECC engine based on a command and the address, and wherein the parity check matrix is based on a default parity check matrix that is generated as a function of the primitive polynomial, and wherein the primitive polynomial has an alpha matrix as a solution belonging to a Galois field.

16. The semiconductor memory device of claim 15, wherein:

the main data includes a plurality of sub-data units, each of the plurality of sub-data units including a plurality of data bits;

the default parity check matrix includes a plurality of column vectors divided into a plurality of code groups corresponding to the plurality of sub-data units and the parity data;

the plurality of column vectors correspond to results of powers of the alpha matrix;

the alpha matrix has exponent values gradually increasing from zero; and each of the plurality of column vectors has elements to which the primitive polynomial is applied to each of the results of the powers of the alpha matrix.

17. The semiconductor memory device of claim 16, wherein the ECC engine includes an ECC decoder configured to apply the respective different syndromes to the single bit error, the adjacent bit errors and the non-adjacent bit errors, and wherein the ECC decoder is configured:
to generate the parity check matrix with first column vectors having remainders obtained by dividing the results of the powers of the alpha matrix by 2k−1, from among the plurality of column vectors, the remainders being smaller than k, where k is a number of the data bits in each of the plurality of sub-data units;
to generate a first sub-check matrix with second column vectors having remainders obtained by dividing the results of the powers of the alpha matrix by 2k−1, from among the plurality of column vectors, the remainders being equal to or greater than k, being smaller than 2k−1 and being even numbers; and
to generate a second sub-check matrix with third column vectors having remainders obtained by dividing the results of the powers of the alpha matrix by 2k−1 and with column vectors having 1+αk−1 type, from among the plurality of column vectors, the remainders being equal to or greater than k, being smaller than 2k−1 and being odd numbers, a being the alpha matrix.

18. The semiconductor memory device of claim 17, wherein the ECC decoder is further configured:

to generate a first syndrome by applying the parity check matrix to the read codeword;

to generate a second syndrome by applying the first sub-check matrix to the read codeword in response to a least significant bit (LSB) of a row address of the address being a low level;

to generate a third syndrome by applying the second sub-check matrix to the read codeword in response to the LSB of the row address being a high level;

to correct the single bit error in the main data based on the first syndrome;

to correct the adjacent bit errors based on the second syndrome in response to the target page being even-numbered; and to correct the adjacent bit errors or the non-adjacent bit errors based on the third syndrome in response to the target page being odd-numbered.

19. The semiconductor memory device of claim 15, further comprising:

an input/output (I/O) gating circuit connected between the ECC engine and the memory cell array, wherein the memory cell array includes a plurality of sub-array blocks in a first direction and in a second direction crossing the first direction, wherein the main data includes a plurality of sub-data units, each of the plurality of sub-data units including a plurality of data bits, and wherein the control logic circuit is configured to control the I/O gating circuit to store the plurality of sub-data units and the parity data in target sub-array block from the plurality of sub-array blocks.

20. A semiconductor memory device, comprising:
a memory cell array including a plurality of volatile memory cells connected to a plurality of word-lines and a plurality of bit-lines;
an error correction code (ECC) engine configured:
- to generate parity data based on main data as a function of an ECC based on a primitive polynomial;
- to store a codeword including the main data and the parity data in a target page of the memory cell array;
- to read the codeword from the target page based on an address to generate a syndrome; and
- to correct at least one error bit in the read codeword based on the syndrome by applying respective different syndromes to a single bit error in the read codeword, adjacent bit errors occurring in adjacent memory cells in the target page and non-adjacent bit errors occurring in non-adjacent memory cells in the target page; and a control logic circuit configured to control the ECC engine based on a command and the address, wherein the ECC engine includes an ECC decoder configured to generate the different syndromes based on a parity check matrix based on a default parity check matrix that is generated as a function of the primitive polynomial, wherein the primitive polynomial has an alpha matrix as a solution belonging to a Galois field, and wherein the ECC decoder is configured:
- to generate a first sub-check matrix and a second sub-check matrix by using the parity check matrix based on a least significant bit (LSB) of a row address of the address;
- to correct the adjacent bit errors by applying the first sub-check matrix to the read codeword in response to the LSB of the row address being a low level; and
- to correct the adjacent bit errors or the non-adjacent bit errors by applying the second sub-check matrix to the read codeword in response to the LSB of the row address being a high level.

* * * * *